(12) United States Patent
Watanabe et al.

(10) Patent No.: US 6,657,738 B1
(45) Date of Patent: Dec. 2, 2003

(54) APPARATUS AND METHOD FOR PROCESSING CHARACTER INFORMATION

(75) Inventors: Kenji Watanabe, Tokyo (JP); Takanobu Kameda, Tokyo (JP); Tomoyuki Shimmura, Tokyo (JP); Hitoshi Hayama, Suwa (JP)

(73) Assignees: King Jim Co., Ltd. (JP); Seiko Epson Corporation (JP)

(*) Notice: Subject to any disclaimer, the term of this patent is extended or adjusted under 35 U.S.C. 154(b) by 232 days.

(21) Appl. No.: 09/761,757

(22) Filed: Jan. 18, 2001

Related U.S. Application Data

(63) Continuation of application No. 08/774,695, filed on Dec. 26, 1996, now Pat. No. 6,226,094.

(30) Foreign Application Priority Data

| Jan. 5, 1996 | (JP) | ................................ 8-318 |
| Jan. 5, 1996 | (JP) | ................................ 8-323 |
| Jan. 5, 1996 | (JP) | ................................ 8-324 |

(51) Int. Cl.$^7$ ............................................. B41J 15/00
(52) U.S. Cl. ...................... 358/1.11; 358/1.2; 358/1.18; 400/615.2
(58) Field of Search ............................. 358/1.11, 1.12, 358/1.2, 1.13, 1.18; 707/517, 520, 505, 508; 345/141, 441, 121; 400/61, 615.2

(56) References Cited

U.S. PATENT DOCUMENTS

| 5,493,639 | A | * | 2/1996 | Hirano et al. ................ 345/441 |
| 5,562,353 | A | * | 10/1996 | Handa et al. ............ 400/615.2 |
| 5,584,591 | A | * | 12/1996 | Mori et al. .............. 400/615.2 |
| 5,606,658 | A | * | 2/1997 | Hirono ........................ 345/471 |
| RE35,562 | E | * | 7/1997 | Hirono et al. ................ 400/3 |
| 6,226,094 | B1 | * | 5/2001 | Watanabe et al. .......... 358/1.11 |

FOREIGN PATENT DOCUMENTS

| EP | 0 574 657 A2 | 3/1993 |
| EP | 0 65 841 A2 | 11/1994 |
| EP | 0 656 606 A2 | 11/1994 |
| JP | 6-31987 | 2/1994 |
| JP | 06-031987 | 8/1994 |
| JP | 6-262820 | 9/1994 |
| JP | 7-78131 | 3/1995 |

* cited by examiner

*Primary Examiner*—Edward Coles
*Assistant Examiner*—Joseph R. Pokrzywa
(74) *Attorney, Agent, or Firm*—Lorusso, Loud & Kelly

(57) ABSTRACT

The apparatus recognizes line length of character strings and judges if a line is longer than a threshold length. Slewing addition control divides a character string longer than the threshold length into two lines. When the number of inputted characters exceeds that allowed in the line, that part of the character string having the number of characters allowed for the line and that part of the characters overflowing the number of characters allowed in the line are displayed in different manners. The apparatus also calculates a ratio of lengths of a pair of specific lines to one or more other pairs, determines a character-size-type based on the ratios thus obtained, determines basic character sizes of the respective lines based on the character-size-type and then determines a character size for each line based on the length information and the basic character size of each line.

2 Claims, 23 Drawing Sheets

| NUMBER OF INPUTTED CHARACTERS | CHARACTER SIZE ||||
|---|---|---|---|---|
| | FIRST LINE | SECOND LINE | THIRD LINE | FOURTH LINE |
| 1 CHARACTER | Hx1 CHARACTER | — | — | — |
| 2 CHARACTERS | REDUCED-REDUCED Hx2 CHARACTER | — | — | — |
| 3 CHARACTERS | REDUCED-REDUCED Gx3 CHARACTER | — | — | — |
| 4 CHARACTERS | Gx2 CHARACTER | Gx2 CHARACTER | — | — |
| 5 CHARACTERS | REDUCED-REDUCED Gx3 CHARACTER | REDUCED-REDUCED Gx2 CHARACTER | — | — |
| 6 CHARACTERS | REDUCED-REDUCED Gx3 CHARACTER | REDUCED-REDUCED Gx3 CHARACTER | — | — |
| 7 CHARACTERS | REDUCED-REDUCED Gx4 CHARACTER | REDUCED-REDUCED Gx3 CHARACTER | — | — |
| 8 CHARACTERS | REDUCED-REDUCED Gx4 CHARACTER | REDUCED-REDUCED Gx4 CHARACTER | — | — |
| 9 CHARACTERS | Mx3 CHARACTER | Mx3 CHARACTER | Mx3 CHARACTER | — |
| 10 CHARACTERS | Mx4 CHARACTER | Mx3 CHARACTER | Mx3 CHARACTER | — |
| 11 CHARACTERS | Mx4 CHARACTER | Mx4 CHARACTER | Mx3 CHARACTER | — |
| 12 CHARACTERS | Mx4 CHARACTER | Mx4 CHARACTER | REDUCED Mx4 CHARACTER | — |
| 13 CHARACTERS | REDUCED Mx5 CHARACTER | REDUCED Mx4 CHARACTER | REDUCED Mx4 CHARACTER | — |
| 14 CHARACTERS | REDUCED Mx5 CHARACTER | REDUCED Mx5 CHARACTER | REDUCED Mx4 CHARACTER | — |
| 15 CHARACTERS | REDUCED Mx5 CHARACTER | REDUCED Mx5 CHARACTER | REDUCED Mx5 CHARACTER | — |
| 16 CHARACTERS | Mx4 CHARACTER | Mx4 CHARACTER | Mx4 CHARACTER | Mx4 CHARACTER |

FIG. 22

RECTANGULAR SEAL

| | LINE LENGTH INFORMATION (NUMBER OF DOTS ON REDUCED S BASIS) x | | | | | | | | |
|---|---|---|---|---|---|---|---|---|---|
| | 7> x≥1 | 13> x≥7 | 15> x≥13 | 17> x≥15 | 22> x≥17 | 27> x≥22 | 32> x≥27 | 37> x≥32 | 47> x≥37 |
| CHARACTER SIZE | EXPANDED H | H | REDUCED H | U | REDUCED U | G | REDUCED G | L | REDUCED L |

| | x | | | |
|---|---|---|---|---|
| | 57> x≥47 | 67> x≥57 | 77> x≥67 | x≥77 |
| CHARACTER SIZE | M | REDUCED M | S | REDUCED S |

FIG. 23

| LONG LINE/ SHORT LINE RATIO r | 1.6 > r ≥ 1 | 2.2 > r ≥ 1.6 | r ≥ 2.2 |
|---|---|---|---|
| TYPE OF CHARACTER SIZE | TYPE 1 | TYPE 0.7 | TYPE 0.5 |

FIG. 24

|  | TYPE 1 | TYPE 0.7 | TYPE 0.5 |
|---|---|---|---|
| NAME SEAL | — | — | — |
| BUSINESS SEAL (SMALL) | S+S | M+S | M+S |
| BUSINESS SEAL (LARGE) | M+M | L+M | L+S |
| RECTANGULAR SEAL | L+L | G+L | G+M |
| ADDRESS SEAL | L+L | G+L | G+M |

FIG. 25

RECTANGULAR SEAL

| Basic Character Size | LINE LENGTH INFORMATION (NUMBER OF DOTS ON REDUCED S BASIS) x | | | | | | | | |
|---|---|---|---|---|---|---|---|---|---|
| | 17> x≥1 | 27> x≥17 | 32> x≥27 | 37> x≥32 | 47> x≥37 | 57> x≥47 | 67> x≥57 | 77> x≥67 | x≥77 |
| G | EXPANDED G | G | REDUCED G | L | REDUCED L | M | REDUCED M | S | REDUCED S |
| L | EXPANDED L | L | L | L | REDUCED L | M | REDUCED M | S | REDUCED S |
| M | EXPANDED M | EXPANDED M | EXPANDED M | EXPANDED M | M | S | REDUCED M | S | REDUCED S |
| S | EXPANDED S | EXPANDED S | EXPANDED S | EXPANDED S | EXPANDED S | S | S | S | REDUCED S |

FIG. 26

| | LONG/MEDIUM $r_1$ | | |
| --- | --- | --- | --- |
| | $1.6 > r_1 \geq 1$ | $2.2 > r_1 \geq 1.6$ | $r_1 \geq 2.2$ |
| MEDIUM/SHORT $r_2$ — $1.4 > r_2 \geq 1$ | TYPE 1 | TYPE 0.7 | TYPE 0.5 |
| MEDIUM/SHORT $r_2$ — $2.0 > r_2 \geq 1.4$ | TYPE 1.4 | MIXED TYPE | TYPE 0.5 |
| MEDIUM/SHORT $r_2$ — $r_2 \geq 2.0$ | TYPE 3 | | |

FIG. 27

| | TYPE 3 | TYPE 1.4 | TYPE 1 | TYPE 0.7 | TYPE 0.5 | MIXED TYPE |
|---|---|---|---|---|---|---|
| NAME SEAL | — | — | — | — | — | — |
| BUSINESS SEAL(SMALL) | — | — | — | — | — | — |
| BUSINESS SEAL(LARGE) | M+S+S | M+S+S | S+S+S | M+S+S | M+S+S | M+S+S |
| RECTANGULAR SEAL | G+S+S | L+M+M | M+M+M | L+M+M | L+L+S | G+M+S |
| ADDRESS SEAL | G+S+S | L+M+M | M+M+M | L+M+M | L+L+S | G+M+S |

FIG. 28

| LONGEST/SECOND LONGEST RATIO r | $1.4 > r \geq 1$ | $r \geq 1.4$ |
|---|---|---|
| CHARACTER SIZE TYPE | TYPE 1 | TYPE 0.7 |

FIG. 29

| | TYPE 1 | TYPE 0.7 |
|---|---|---|
| NAME SEAL | — | — |
| BUSINESS SEAL (SMALL) | — | — |
| BUSINESS SEAL (LARGE) | — | — |
| RECTANGULAR SEAL | S+S+S+S | M+M+M+S |
| ADDRESS SEAL | S+S+S+S | M+M+M+S |

APPARATUS AND METHOD FOR PROCESSING CHARACTER INFORMATION

This application is a continuation of U.S. Application Ser. No. 08/774,695 filed Dec. 26, 1996, now U.S. Pat. No. 6,226,094 and allowed on Nov. 15, 2000.

BACKGROUND OF THE INVENTION

1. Field of the Invention

This invention relates to an apparatus for processing character information in which character strings of one or more lines are transferred or printed on a printing medium having limitation on its longitudinal and/or transversal dimensions. This invention can be applied to, for example, a seal producing apparatus in which a seal is produced by selectively irradiating ultraviolet light onto a seal face member made of ultraviolet-curade resin to cure the portions of the seal face member corresponding to an inputted character string (i.e., transfer an inputted character string to the seal face member), and removing the portions not cured.

2. Description of the Related Art

As a seal producing apparatus with which persons other than experts or manufacturers specialized in producing seals can easily produce a desired seal, there has been heretofore proposed a seal face producing apparatus disclosed in Japanese Patent Application 6-278350.

The seal producing apparatus disclosed in this application comprises: (a) a seal face member made of resin in which the state of the portion subjected to rays having a predetermined wavelength (e.g., ultraviolet light) becomes different (for example, cured) from that of the other portions, so that unevenness can be formed thereon with the aid of a predetermined fluid; (2) information processing means for processing information of the imprint pattern corresponding to the pattern formed by recessed and projected portions of the seal face member; (3) negative film preparing means for preparing a negative film carrying thereon the imprint pattern formed by print processing based on the imprint pattern information; (4) negative film conveying means for conveying the negative film thus prepared from or to the place where the light is irradiated; and (5) ray irradiating means for irradiating the rays having a predetermined wavelength via the negative film onto the seal face member made of resin.

The above-mentioned patent application discloses details of how to form unevenness on the seal face member based on imprint pattern information introduced by the information processing means, but fails to disclose details of how to introduce the imprint pattern information. Specifically, the above-mentioned application merely discloses that means for introducing inputted character string (including not only a keyboard but also a mechanism for controlling the keyboard), and so-called image scanners which are employed in word processors, personal computers, or the like can be used as the information processing means for introducing the imprint information.

However, the conventional information processing means employed in word processors or personal computers and adapted to introduce inputted character strings are designed without paying any regard to the fact that the information of the imprint image is reflected to the seal face member. Specifically, such means has no particular function of reflecting the information of a seal pattern.

Accordingly, in the conventional art, when the user inputs information of an imprint pattern consisting of a character string, the user has often to do many operations associated with an arrangement of the character string, such as deciding a character size, and deciding the number of lines (in particular, executing slewing), in view of the seal face member. The operation of inputting a character string, when performed solely, rarely raises difficulties in operability. However, the operation is accompanied by other operations for appropriate arrangement of the character string, such arrangement serving as information of the imprint pattern, the user must perform many operations, resulting in considerably lowered operability.

Further, if the user forgets to perform such operations for appropriately arranging the character string (for example, performing slewing), a seal having a smaller proportion of the imprint pattern portion (black ratio) based on the total area of the seal face is produced, thereby giving unnatural impression.

A printing sheet serving as a printing medium used for a word processor has a limitation in the number of characters to be printed. However, if characters whose number exceeds the limit are input, it is sufficient to use another sheet to print the characters which cannot be printed in the first sheet. Accordingly, there is no substantial limitation in the number of characters to be inputted. In contrast, the seal face member on which an imprint pattern is reflected has fixed longitudinal and transversal dimensions. Therefore, the number of characters to be contained in a seal face member has an upper limit (restriction) even though the smallest character size is employed, and as a matter of course the characters overflowing the limited number of characters cannot be reflected on another seal face member.

Accordingly, input methods employed in word processors or personal computers cannot be applied to seal producing apparatuses as they are in view of such limitation imposed on the number of characters to be inputted.

Meanwhile, among tape printing apparatuses adapted to print an inputted character string on a tape, there is an apparatus employing a character input method in which limitation is imposed on the number of characters to inhibit the input of characters overflowing the limited number, thereby preventing the production of an unusual label (formed by cutting a printing tape) having an unnecessary length. Such a method having a function of restricting the number of characters to be inputted appears to be applicable to a seal producing apparatuses.

However, there is a great difference between a tape and a seal face member in that the tape has no limitation in its longitudinal dimension while the seal face member has limits in its longitudinal and transversal dimensions. Therefore, when the character input method employed in a tape printing apparatus is applied to a seal producing apparatus as it is, sufficient effect cannot be necessarily obtained. Accordingly, when an seal producing apparatus to which the character input method employed in a tape printing apparatus is directly applied is used, there are some problems as follows: the user knows that the character input was improper for the first time when the user executes printing or activates a layout display and is informed by the display that the inputted character string cannot be printed as it is.

Further, the seal producing apparatus has a function of registering a kanji compound word, but limitations are imposed on the number of characters of the kanji compound word and on the number of characters representing the reading of the kanji compound word. Under the state that the number of determined characters reaches the limited number, after operations of determining a kanji compound word to be registered and storing it for registration or an operation of determining the reading of the registered word are executed, in some cases inputted candidate characters not converted remains at the tail thereof. In particular, in the case where a selection dial, which is rotated to designate an input candidate character, is employed, even when the user slightly touches the dial by mistake, an input candidate character is sent, and the above-mentioned state is likely to take place. Conventional apparatuses do not respond to such an instruction of storage for registration issued under the above-mentioned state, and continue to display the same contents as before. Therefore, the user is required to delete the input candidate character and thereafter perform an operation of issuing an instruction of storage for registration. Thus, the user was required to issue an instruction of storage for registration as many as two times.

Further, for appropriate arrangement of a character string, the user has to determine the character sizes for the respective lines. However, it is difficult for the user to know whether the imprint pattern is appropriately arranged on the seal face member when the character size is determined. Therefore, there are many cases where inappropriate character sizes are set.

Meanwhile, among tape printing apparatuses adapted to print an inputted character string on a tape, there is an apparatus of the type in which specific character sizes for the respective lines are automatically determined by the apparatus even when the user do not input them (for example, Japanese Patent Application Laid-Open 7-125376).

However, as described above, a tape associated with a tape printing apparatus has a limitation imposed on its transversal dimension but does not have any limitation on its longitudinal dimension. Therefore, the function of a tape printing apparatus that specific character sizes are automatically determined for the respective lines cannot be applied to a seal producing apparatus associated with a seal having limitations in both transversal and longitudinal dimensions.

In view of various problems described above, there has been a need for a seal producing apparatus equipped with information processing means endowed with a particular function of reflecting imprint pattern information on a seal face member.

The above-mentioned problem arises not only in a seal producing apparatus having a seal face member formed with unevenness but also in a seal producing apparatus having the seal face member from which ink partially oozes to form an imprint image on a sheet. Further, the above-mentioned problem also arises in a character information processing apparatus which employs a print or transfer medium having such limitations as imposed on the arrangement of the character string in the seal producing apparatus. More specifically, such a problem arises in the case where a character string is developed and displayed within a display area having fixed dimensions, such as a window display in a personal computer or the like.

SUMMARY OF THE INVENTION

An object of the present invention is to provide an apparatus for processing character information in which appropriate arrangement of an inputted character string on print or transfer mediums having limitations in both its longitudinal and transversal dimensions, such as in a seal face member can be realized by simple operations.

Another object of the present invention is to provide an apparatus for processing character information in which under the situation that a print or transfer medium has limitations in both its longitudinal and transversal dimensions as in a seal face member, the propriety of the character input can be judged at the stage of character input.

A still another object of the present invention is to provide an apparatus in which operability is enhanced when a character string having a limitation on the number of characters is stored in the apparatus.

A further object of the present invention is to provide an apparatus and method for processing character information in which an appropriate arrangement of inputted character string can be realized by a simple operation when an inputted character string is developed in a rectangular area having a predetermined width in the reading direction of the character string.

According to the first aspect of the present invention, an apparatus for processing character information in which a dot pattern of an inputted character string is developed in a buffer in accordance with the size of a printing area or a transfer area comprises: (1) line length judging means for recognizing length information of the respective lines of the inputted character strings and judging the existence of a line longer than a threshold length determined by the size of the print area or the transfer area when an instruction for the development is issued; (2) slewing addition control means for dividing a character string longer than the threshold length into two parts to obtain character strings of two lines; and (3) character string developing means for developing a character string to which slewing is added in an inputted character string.

In the apparatus for processing character information, when an instruction of developing an inputted character string in a buffer is issued, the line length judging means recognizes length information of the respective lines of the inputted character string, and judges the existence of a line longer than a threshold length determined by the type of a dimension of a print medium or transfer medium, and the slewing addition control means divides the character string longer than the threshold length into character strings of two lines, and the character string developing means develops a character string to which slewing is added on an inputted character string in a buffer.

According to the second aspect of the present invention, an apparatus for processing character information in which a dot pattern of an inputted character string is developed in a buffer in accordance with the size of a print area or a transfer area comprises: (1) character-string-length-information recognizing means for recognizing a total of length information of the respective characters of the inputted character string; (2) character arrangement determining means for determining a character size, the number of lines and the number of characters in each line in accordance with the total of length information of the respective characters thus recognized; and (3) character string developing means for developing the inputted character string in accordance with the character size, the number of lines and the number of characters in each line determined by the character arrangement determining means.

In the apparatus for processing character information according to the second aspect of the present invention, the character number recognizing means recognizes the total character number, the character arrangement determining means determines the character size, the number of lines and the character numbers of the respective lines in accordance with the total character number thus recognized. Also, the character string developing means develops the input character string in the buffer in accordance with the character size, the number of lines, the number of characters in the respective lines determined by the character arrangement determining means.

According to the third aspect of the present invention, an apparatus for processing character information in which an inputted character string is printed in a print area whose transversal and longitudinal dimensions are limited, comprises: (1) display means for displaying an inputted character string; (2) line allowable character number determining means for determining the number of characters allowed in each line; and (3) display control means for displaying, when the number of inputted characters exceeds the number of characters allowed in the line, the part of the character string associated with the characters within the number of characters allowed for the line and the part of the character string associated with the characters overflowing the number of characters allowed in the line in different displaying manners.

In the apparatus for processing character information according to the third aspect of the present invention, the number of characters allowed in the respective lines are determined. When the input character number exceeds the number of characters allowed in the line, the characters in the exceeding portion and the characters in the not exceeding portion are displayed in different manners. With this configuration, the user can recognize the propriety of the input character string in the input stage before printing or layout display is carried out, and cope with the situation appropriately by, for example, slewing.

According to the fourth aspect of the present invention, an apparatus for processing character information endowed with a function of registering a character string whose number of characters is limited into the apparatus, and having candidate character input means for inputting input candidate character, character number limiting means for accepting input candidate characters thus inputted when the number of determined characters is not larger than a limited character number, and registration instructing means for outputting a signal of instructing registration of the inputted character string comprises: (1) judging means for judging, when an output signal is sent from the registration instructing means, whether or not the inputted character string satisfies a condition that the number of inputted and determined characters is equal to the limited character number, and whether or not an inputted character exists at the tail of the determined character string; and (2) registration executing means for registering the determined character string excluding the input candidate character when the judging means judges that the inputted character string satisfies the conditions that the number of inputted and determined characters is equal to the limited character number and that an inputted character exists at the tail of the determined character string.

In the apparatus for processing character information according to the fourth aspect of the present invention, when the inputted and determined character number is equal to the limited character number and an instruction for registration is issued under the state that an input candidate character exists at the tail of the determined character string, the inputted and determined character string excluding the input candidate character is registered. With this configuration, even when the user mistakenly inputs input candidate character after inputting a necessary character string up to the limited character number, the user does not need to delete the input candidate character thus mistakenly inputted when issuing an instruction for registration, so that operability is enhanced.

According to the fifth aspect of the present invention, a method for processing character information including a step of developing an inputted character string in a rectangular area having a predetermined width in the reading direction of a character string comprise: (1) a line length calculating step of obtaining, when the number of lines of inputted character strings is two or more, length information of the respective lines and the order of the length information, the length information of the respective lines being obtained assuming that the character sizes allocated to the respective lines are the same; (2) a character-size-type determining step of calculating a ratio in length between specific two lines of a pair with respect to one or more pairs, and determining a character-size type among the respective lines based on the one or more ratios thus obtained; (3) a basic character size determining step of determining basic character sizes of the respective lines based on the character size type thus determined; and (4) a character size determining step of determining a character size of each line based on the length information and the basic character size of each line.

According to the sixth aspect of the present invention, an apparatus for processing character information, in which, an inputted character string is developed in a rectangular area having a predetermined width in the reading direction of the character string, and a dot pattern of the inputted character string is developed in a buffer in accordance with lengthwise and widthwise dimensions of a print medium comprises: (1) line length calculating means for obtaining, when it is judged that the number of lines of the inputted character string is two or more, length information of the respective lines and the order of the length information, the length information of the respective lines being obtained assuming that the character sizes allocated to the respective lines are the same; (2) character-size-type determining means for calculating a ratio in length between specific two lines of a pair with respect to one or more pairs, and determining a character-size-type among the respective lines based on the one or more ratios thus obtained; (3) basic character size determining means for determining basic character sizes of the respective lines based on the character-size-type thus determined; and (4) character size determining means for determining a character size of each line based on the length information and the basic character size of each line.

In the method for processing character information according to the fifth aspect of the present invention and the apparatus for processing character information according to the sixth aspect of the present invention, when the number of lines of the input character string is two or more, length information of the respective lines to which the same character size is allocated are obtained, and concurrently the order of the length information is obtained; a ratio in length between specific two lines of a pair is obtained with respect to one or more pairs, and a character size type throughout the respective lines is determined based on the one or more ratios thus obtained; basic character sizes of the respective lines is obtained based on the character size type thus determined; and thereafter character sizes of the respective lines are obtained based on the length information and the basic character size of the respective lines. With this configuration, the proportion of the character string in a print medium or display area having limitations on its longitudinal and transversal dimensions can be enhanced without requiring the user to perform complicated operations.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIGS. 9A and 9B are views illustrating usefulness of automatic slewing function applied to a line containing a large number of characters;

FIGS. 10A, 10B and 10C are views illustrating the state of text data and the resultant of plate making when slewing is executed at a mode mark and the latter character string is long;

FIGS. 11A, 11B and 11C are views illustrating the state of text data and the resultant of plate making when a slewing is executed at a mode mark and the latter character string is long;

FIGS. 12A, 12B and 12C are views illustrating the state of the text data and the resultant of plate making when slewing is executed at a position simply bisecting the longest line containing a mode mark;

FIG. 14 is a view showing a configuration of a table referred when a character string inputted in form input of a rectangular seal is developed in a buffer;

FIG. 22 is a view illustrating a decision table for deciding a character size used in a rectangular seal containing one line;

FIG. 23 is a view illustrating a decision table for deciding a character size type for two lines;

FIG. 24 is a view illustrating a decision table for deciding a basic character size for two lines;

FIG. 25 is a view illustrating a decision table for deciding a character size used in a rectangular seal containing a plurality of lines;

FIG. 26 is a view illustrating a decision table for deciding a character size type for three lines;

FIG. 27 is a view illustrating a decision table for deciding a basic character size for three lines;

FIG. 28 is a view illustrating a decision table for deciding a character size type for four lines; and FIG. 29 is a view illustrating a decision table for deciding a basic character size for four lines.

DETAILED DESCRIPTION OF THE INVENTION

Hereinafter, an embodiment of a seal producing apparatus to which the apparatus for processing character information according to the first aspect of the present invention is applied with reference to the drawings.

Figure 1:
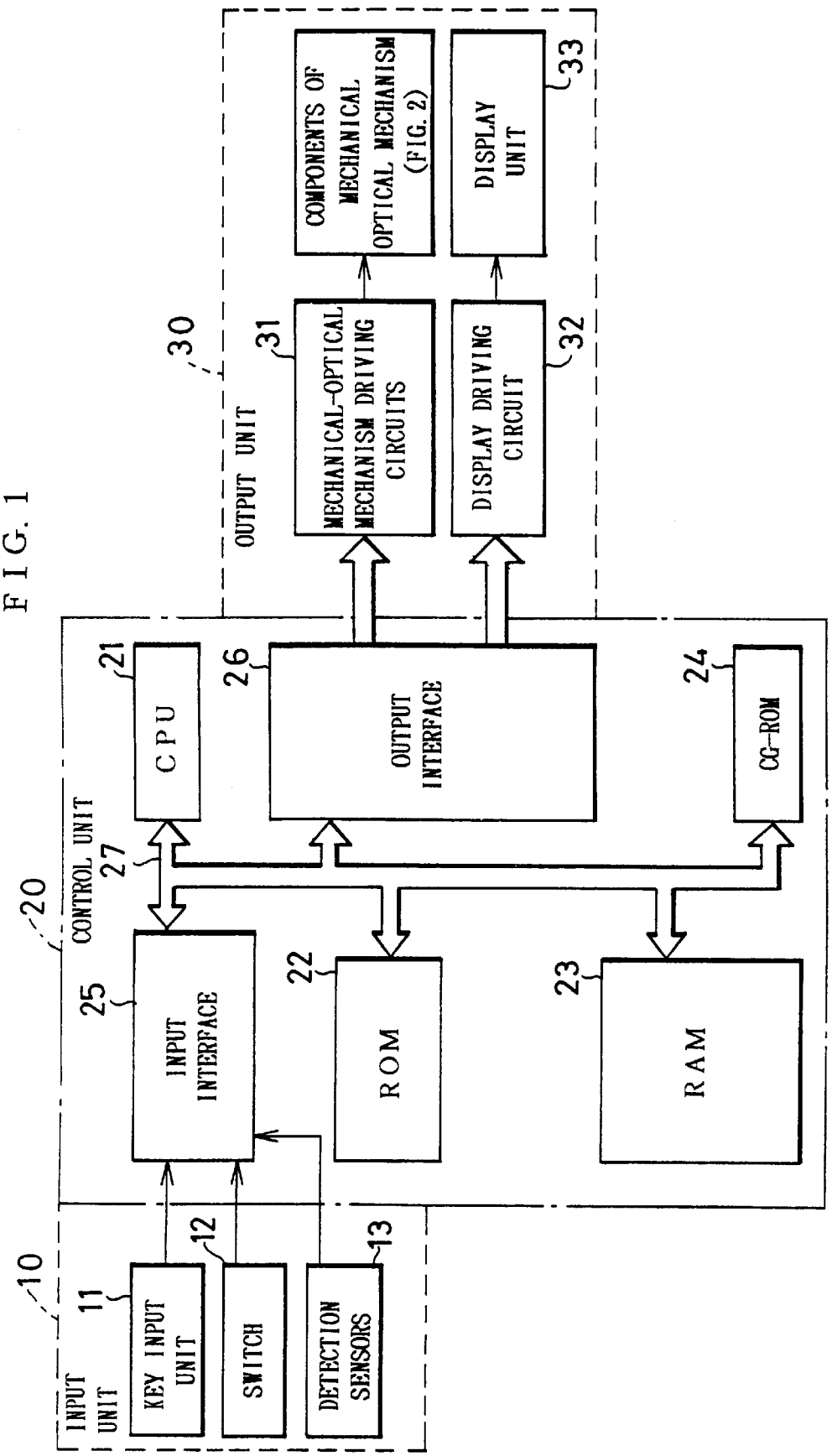
FIG. 1 is a block diagram showing an electrical mechanism in the embodiments according to the first to sixth aspects of the present invention.
Figure 2:
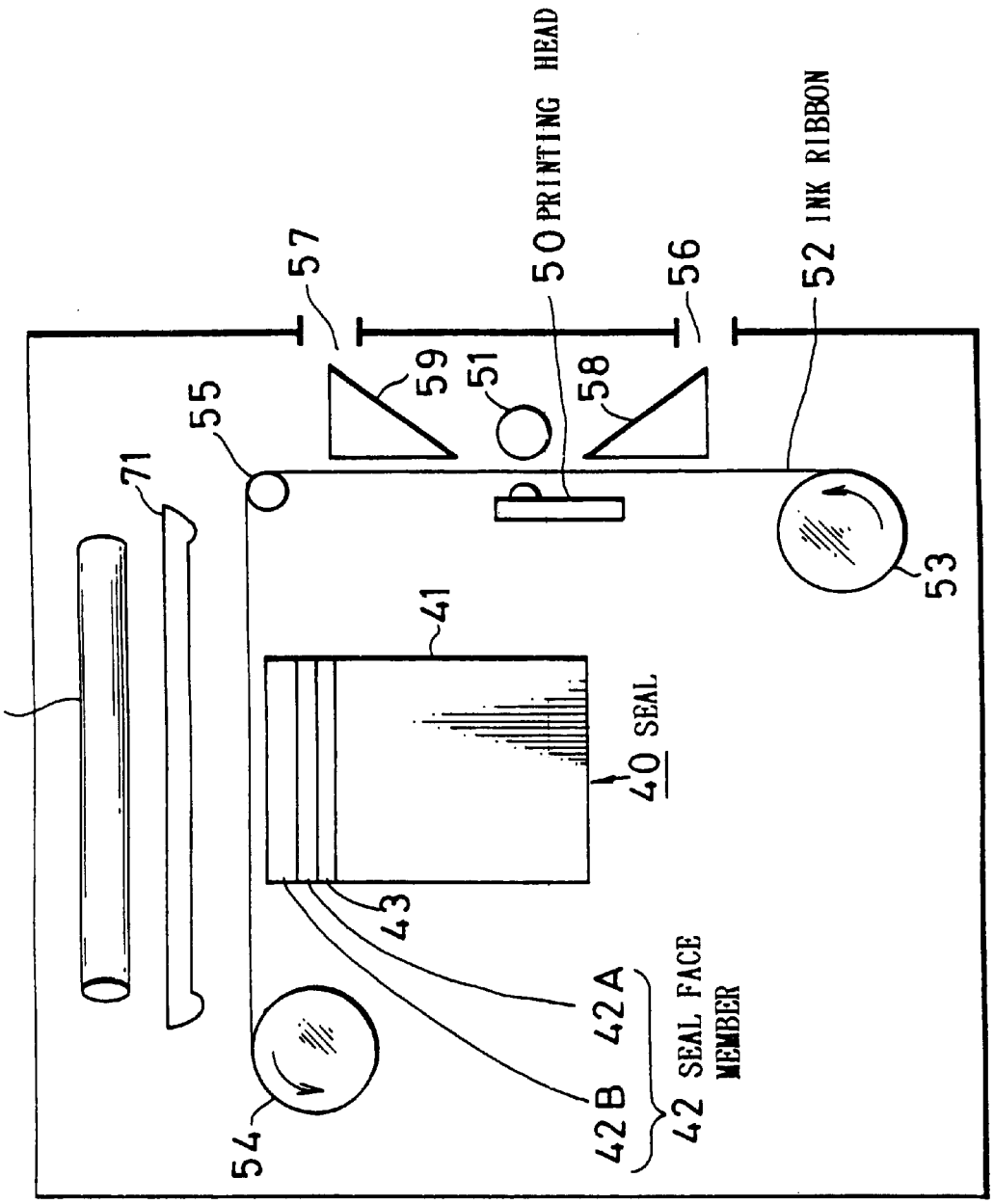
FIG. 2 is a view showing an arrangement of a mechanical-optical mechanism in the embodiments according to the first to sixth aspects of the present invention.
Figure 3:
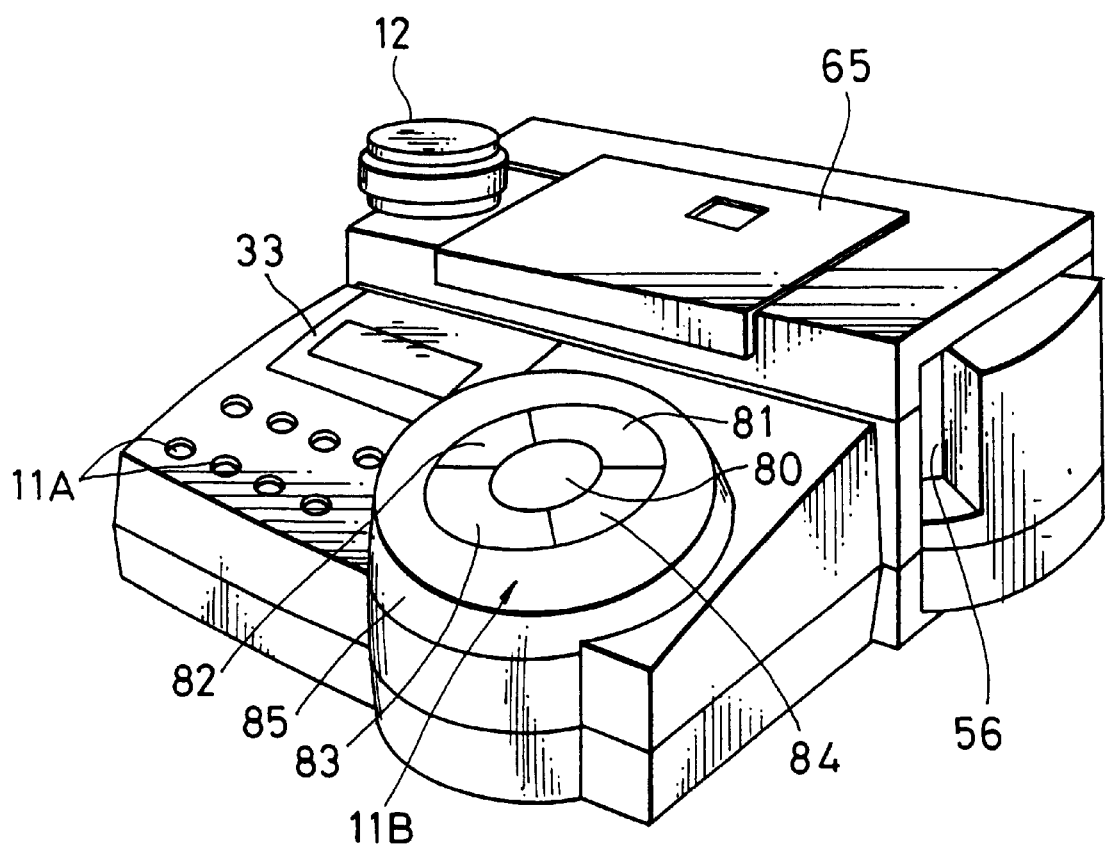
FIG. 3 is a perspective view showing the outer appearance of the embodiments of the first to sixth aspects of the present invention.

The seal producing apparatus of this embodiment, roughly speaking, comprises an electrical mechanism (including an information processing unit and an imprint transfer control unit) shown in FIG. 1, and a mechanical-optical mechanism (including a printing unit and a light irradiation unit) shown in FIG. 2. FIG. 2 also shows the configuration of a seal itself. FIG. 3 is a perspective view of the seal producing apparatus.

Referring to the block diagram in FIG. 1 and the perspective view in FIG. 3, the electrical mechanism in this embodiment will be described.

The electrical mechanism is adapted mainly to introduce imprint pattern information so as to control the mechanical-optical mechanism, and categorized into a type of information processor. The electrical mechanism, roughly speaking, comprises an input unit 10, a control unit 20 and an output unit 30, as in other information processors. The control unit 20 is adapted to execute processing in accordance with information supplied from the input unit 10 and a processing stage at that time, and to control the mechanical-optical mechanism via the output unit 30 based on the results of the processing, etc.

The input unit 10 comprises a key input unit 11 having a depression key section 11A and a dial key section 11B, a switch 12 for switching the state of the apparatus, and various types of detection sensors 13.

The key input unit 11 is adapted to generate various types of control data, such as character code data to be supplied to the control unit 20. In the key input unit 11, the dial key section 11B is adapted to generate general operation signals for character input as well as to output operation signals associated with functions other than character input and specific operation signals for character input, such as deletion of inputted characters.

Figure 4:
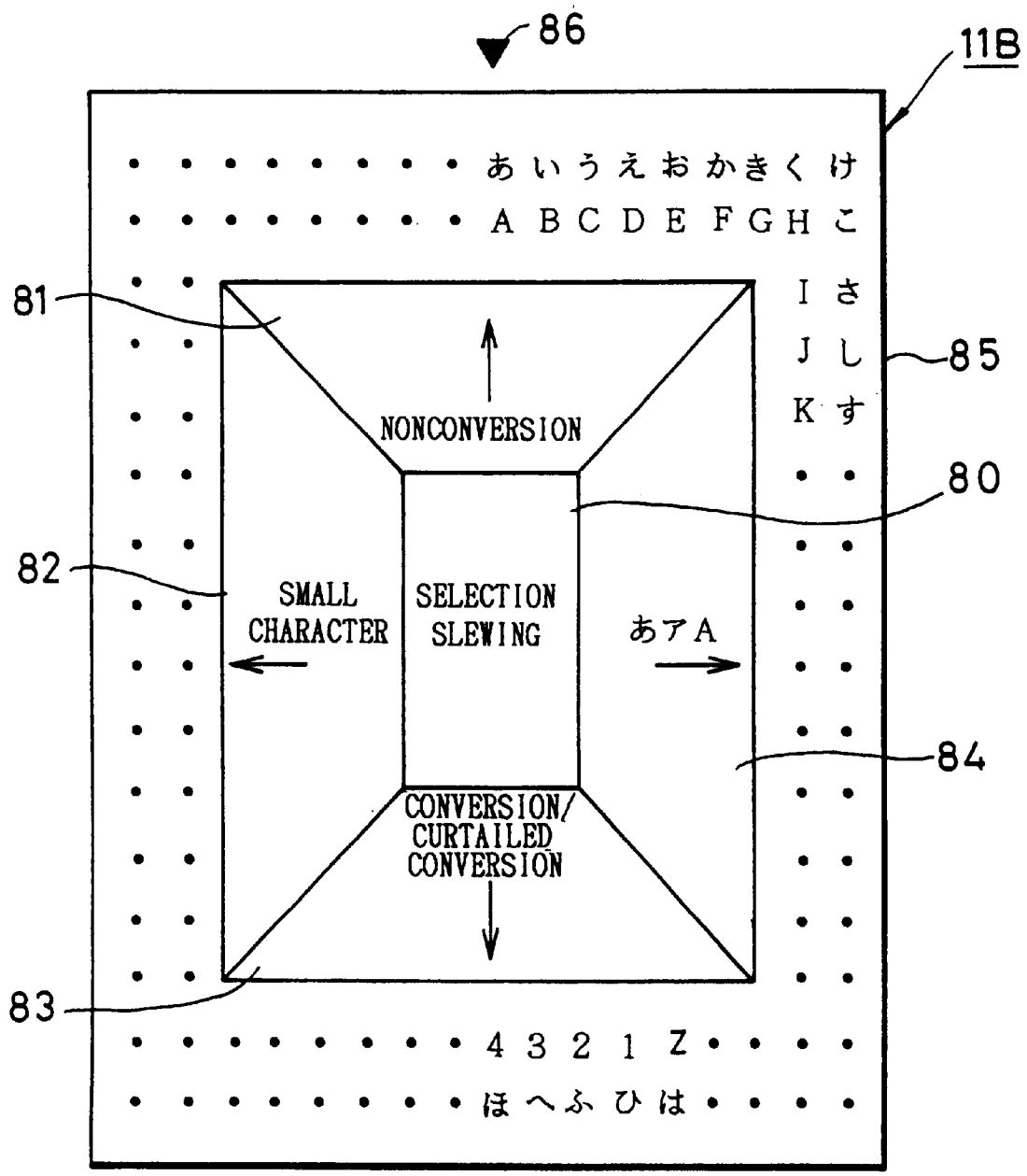
FIG. 4 is a schematic plan view of a character selecting dial section 11B in the embodiments according to the first to sixth aspects of the present invention.

The dial key section 11B comprises, as shown in FIG. 3, a selection slewing key 80 positioned at the center, cursor moving keys 81 to 84 surrounding the selection slewing key 80, and selection dial 85 surrounding the cursor moving keys 81 to 84. FIG. 4 shows allocations of characters and allocation of character input functions in the character selection dial section 11B. In FIG. 4, circular or torus-shaped portions are shown as rectangular portions for convenience of illustration.

The character selection dial 85 is rotatable clockwise and counterclockwise. The dial 85 can be indexed by a unit angle determined by dividing the circumference into, for example, 54 portions. As shown in FIG. 4, in the dial 85, the characters "あいうえお . . . " are printed along the outer circumference and the characters "ABCDE . . . " are printed along the inner circumference. The dial 85 is adapted to transmit a signal of a character indicated by the character designation mark 86 to the control unit 20. Note that, with respect to the characters allocated to the same unit angle, for example, "あ" and "A", the character signals are the same. It is judged by the control unit 20 whether the character "あ" or the character "A" is inputted in accordance with the character type signal held in the unit 20 at that time.

The cursor upward moving key 81 is constituted as a depression key. On the cursor upward moving key 81, characters "↑" and "無変換" (nonconversion) are printed. When the cursor upward moving key 81 is operated, the control unit 20 issues a warning under a character input state that neither nonconverting action nor cursor upward moving action can be accepted, executes a nonconverting action under a character input state that the cursor upward moving action cannot be accepted, and executes a cursor upward moving action under the other character input states.

Similarly, the cursor leftward moving key 82, the cursor downward moving key 83, and the cursor rightward moving key 84 are also associated with actions other than cursor moving actions. The control unit 20 is adapted to judge which action is instructed in accordance with the character input state resumed when an operation signal is supplied from these keys. As another action than the cursor moving action, the cursor leftward moving key 82 is allocated an action of converting into a small character and switching to small character input (including a capital letter restored from a small letter). The cursor downward moving key 83 is allocated a kana-kanji-converting action, and the cursor rightward moving key 84 is allocated an "あアA" converting action for switching among hiragana input, katakana input and alphabet input.

The selection slewing key 80 is allocated a slewing function and a selecting function. The control unit 20 executes a slewing action or selecting action depending on the character input state resumed when an operation signal is supplied from these keys.

The switch 12 is constituted by, for example, a dial switch, and is adapted to instruct turning-on and turning-off of the power, starting exposure to the seal (the seal face member) and opening a cover member 65 provided at a space for accommodating the seal. As the detection sensors, a sensor for detecting the type of a seal, a sensor for detecting attachment of an ink ribbon, and a sensor for detecting attachment and position of a plate-making sheet as later described can be mentioned.

As the types of the seal, a "rectangular seal" having a substantially square-shaped seal face member; a "name seal" having suitable dimensions for use as a name seal and a rectangular-shaped seal face member; an "address seal" having suitable dimensions for use as an address seal and a rectangular-shaped seal face member; a "business seal" having suitable dimensions for use as a seal containing various types of characters used in business scenes, namely, dimensions intermediate between those of the name seal and those of address seal, and a rectangular-shaped seal face member, and the like are provided. Note that, in this embodiment, as the business seal, two types of seals having different dimensions are provided. These types of seals are discriminated by the above-mentioned sensor 13.

The output unit 30 comprises a mechanical-optical mechanism driving circuits 31 for driving and controlling each section of the mechanical-optical mechanism as later described, and a driving circuit 32 for driving the display unit 33. The driving circuits 31 and 32 are adapted to drive their associated units under the control of the control unit 20.

Figure 5:
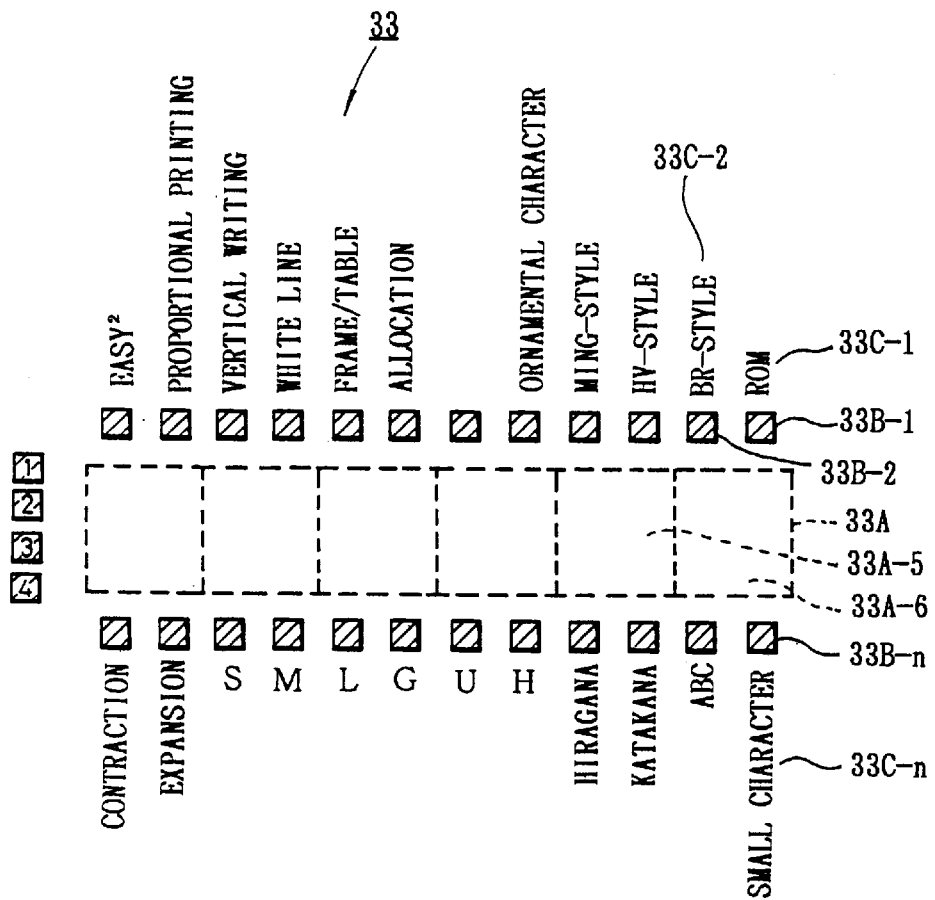
FIG. 5 is a plan view of a display unit 33 in the embodiments according to the first to sixth aspects of the present invention.

The display unit 33, as shown in FIG. 5, comprises a liquid crystal display 33A capable of displaying, for example, six letters, and a plurality of indicators 33B-1 to 33B-n arranged around the liquid crystal display 33A. The liquid crystal display 33A displays a guidance message for the user, and a character string inputted by the user. At the portions on the surface of the apparatus associated with the respective indicators 33B-1, . . . , 33B-n, characters 33C-1, . . . , 33C-n representing the attributes or states allocated to the respective indicators are printed. The current attributes or states are shown by lighting, lighting-off or flashing of the indicators 33B-1, . . . , 33B-n.

This embodiment basically employs a cursor fixed display method wherein the cursor is fixedly displayed at the fifth character display area 33A-5 of the crystal display 33A. Also, the display area for the candidate character indicated by the selection dial 85 is set on the sixth character display area 33A-6 on the crystal display 33A.

Further, with respect to the manner of displaying characters on the liquid crystal display 33A, a "positive display", a "negative display" and a "flashing display" in which the "positive display" and the "negative display" alternate are mentioned. The "positive display" is a manner of displaying determined characters and semi-determined characters (in the state of semi-determined characters, conversion only between a hiragana and a katakana can be executed). The "negative display" is a manner of displaying characters in the state that the characters are introduced from the character selection dial 85, that is, tentatively determined characters. In the state of tentatively determined characters, the currently displayed hiragana can be converted into a hiragana, a katakana or a kanji. The "flashing display" is a manner of displaying an input candidate character indicated by the character selection dial 85. Incidentally, "hiragana" is one of the character style of the Japanese language.

Hereinafter, the character displayed in the "positive display" (determined characters and tentatively determined characters) are referred to as "positive character", the character displayed in the "negative display" as "negative character", and the character displayed in the "flashing display" (input candidate characters) as "flashing character".

Incidentally, the mechanical-optical mechanism driving circuits 31 actually comprises various driving circuits, but are shown in a block in the drawing. The mechanical-optical mechanism has various components which must be controlled as described later, and actually has their associated driving circuits.

The control unit 20 is constituted by, for example, a microcomputer. The unit 20 comprises a CPU 21, a ROM 22, a RAM 23, a character generator ROM (CG-ROM) 24, an input interface 25 and an output interface 26 that are connected via a system bus 27.

The ROM 22 stores various types of processing programs for producing a seal executed by the CPU 21 (see FIGS. 8 and 13), and fixed data such as dictionary data for kana-kanji conversion and data for determining character sizes (see FIG. 14).

The RAM 23 is used as a working memory by the CPU 21 and adapted to store fixed data associated with user input. The RAM 23 is backed up even when the power is turned off.

The CG-ROM 24 is adapted to store dot patterns (fonts) of the letters and symbols provided in the seal producing apparatus and to output, when code data for specifying a letter or symbol are supplied, dot patterns corresponding thereto. Two types of CG-ROMs may be provided, one for display use, the other for printing use. In this embodiment, font information stored in the CG-ROM 24 is bit map font. Further, the CG-ROM 24 does not need to store the dot patterns of all the character sizes allowed by the apparatus. The dot patterns of the character sizes not provided in the CG-ROM 24 can be prepared by expanding or contracting the dot patterns of character sizes already provided in the apparatus.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, appropriately using fixed data stored in the ROM 22 or RAM 23. Also, the CPU 21 is adapted to cause the display unit 33 to display the state or result of the processing, or drives each component of the mechanical-optical mechanism (FIG. 2) so as to produce a seal.

Next, the configurations of the mechanical-optical mechanism and the seal will be described with reference to FIG. 2.

The seal 40 comprises a base member 41 (which may be made of a material other than wood), a sponge member 43 attached on one surface of the base member 41 for enhancing contact between of the projected portions of the seal face member and a sheet by absorbing pressing force and pressing force reaction when the seal is stamped, and a planar seal face member 42. The seal face member 42 comprises a base layer 42A insensitive to ultraviolet light, and an ultraviolet-cured-resin layer 42B exposing to the outside. In the ultraviolet-cured-resin layer 42B, portions other than the cured portion can be removed with a specific liquid (e.g., water; a gas may be also employed).

One side surface of the base member 41 of the seal 40 is provided with a plurality of not penetrating holes (not shown) which engage with plurality of projections provided on the seal 40 for mounting the seal 40. Also, the end surface of the base member 41 of the seal 40 provided on the side where the seal face member 42 is not provided has a physical identification member, such as holes, for identifying the type of a seal. The physical identification member is read by a detecting sensor 13 for discriminating the type of a seal.

The mechanical-optical mechanism shown in FIG. 2, roughly speaking, comprises a printing structure and an ultraviolet irradiation structure.

The printing structure employs a thermal transfer method and comprises a printing head 50 of a fixed type, a platen roller 51, an ink ribbon 52, a feeding reel 53, a winding reel 54, a roller 55 for switching the proceeding direction of the ink ribbon 52. The printing structure further comprises an insertion hole 56 for inserting a plate-making sheet (see FIG. 6Q), a discharging hole 57 for discharging the plate-making sheet, a guide member (including a detection sensor for detecting attachment and position of the plate-making sheet) 58 for guiding the plate-making sheet inserted from the insertion hole 56 to a printing position, and a separation structure 59 for separating the plate-making sheet from the ink ribbon 52, both fed from the printing position, so as to guide the plate-making sheet thus separated to the discharging hole 57.

Figure 6A:
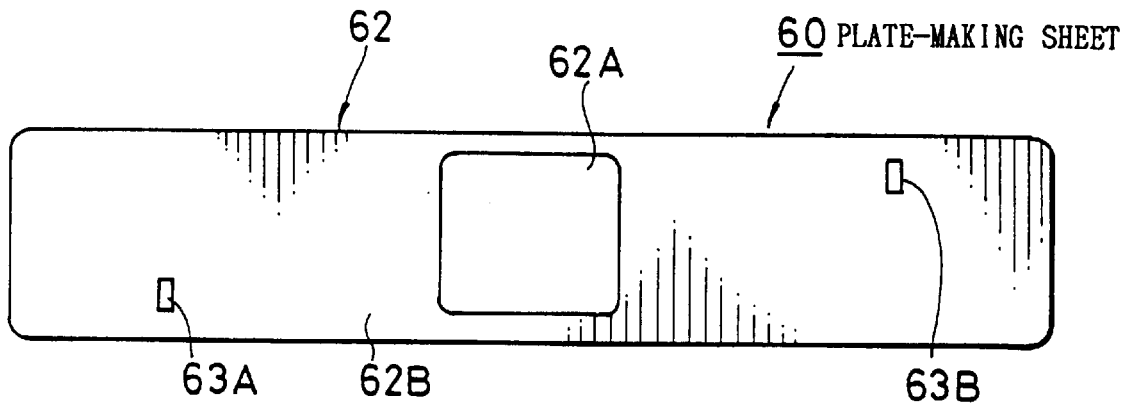
FIGS. 6A and 6B are views illustrating a plate-making sheet 60 in the embodiments according to the first to sixth aspects of the present invention.
Figure 6B:

As shown in FIGS. 6A and 6B illustrating a plate-making sheet 60 used for a rectangular seal, the plate-making sheet 60 comprises a sheet body 62 having a rear surface coated with an adhesive agent, and a peelable paper 61 adhered on the rear surface of the sheet body 62. The plate-making sheet 60 has the same size irrespective of types of the seal. The sheet 60 has holes 63A and 63B provided symmetrically with respect to the center of the sheet and adapted to indicate a print starting position. The sheet body 62 is divided into a portion 62A having the same shape as the contour of the seal face member 42, which depends on the type of the seal, and a portion 62B other than the portion 62A. Portions 62A and 62B can be separated from each other by half cut, whereby only the portion 62A can be peeled separately. The term "half cut" as used herein refers to the sate of the sheet in which only the sheet body 62 is formed with a slit dividing the portions 62A and 62B while the peelable portion 61 is continuous, that is, not formed with such a slit.

When the plate-making sheet 60 is inserted into the insertion hole 56, the edge portion of the plate-making sheet 60 and the ink ribbon 52 are superposed and placed at the printing position between the printing head 50 and the platen roller 51.

The printing head 50 is adapted to transfer ink of the ink ribbon to the plate-making sheet 60 by generating heat when the heat generation driving circuit (see reference numeral 31 in FIG. 1) is activated under the control unit 20. In the ink ribbon 52 of a thermal transfer method, the transferred portion loses ink and becomes transparent.

That is, the ink ribbon 52 obtained after transferring operation comprises a portion which allows ultraviolet light to pass through (a portion from which ink is removed) and a portion which hinders ultraviolet light from passing through (a portion where ink remains). Accordingly, the ink ribbon obtained after the transferring operation, namely, the ink ribbon in which printing of an imprint pattern and consequently transparent portions corresponding to the imprint pattern is formed, is used as a negative film. As described above, the sheet on which printing is executed is used for preparing a negative film, and accordingly the sheet is referred to as "plate-making sheet", and executing printing is referred to as "plate making" in this specification.

In the plate making process, the ink ribbon 52 and the plate-making sheet superposed each other after passing the printing section consisting of the printing head 50 and a platen roller 51 are conveyed by the action of the platen roller 51 (or a driving roller not shown) to reach the separation structure 59, by which the ink ribbon 52 and the plate-making sheet 60 are separated.

The separated plate-making sheet 60 is fed to the discharging hole 57. On the other hand, the separated ink ribbon 52 is adapted to stop at the position opposite to the ultraviolet cured resin layer 42B of the seal 40. The ink ribbon 52 thus fed during the plate-making operation is adapted to be wound around the winding reel 54.

After the plate-making sheet 60 is discharged from the discharging hole 57, the printed portion 62A thereof is peeled off and attached on the top surface of the seal 40 to help the user recognize the imprint pattern formed on the seal face member of the seal 40.

As the ultraviolet light irradiating structure, an ultraviolet irradiation light source (having, for example, a paraboloidal mirror surface) 70, which may be constituted by, for example, a fluorescent lamp, is fixedly provided. Turning on and off of the light source 70 is controlled by the control unit 20. Also, a transparent plate 71, which is moved forward and backward by a forward-backward moving structure (not shown), is provided opposite to the ultraviolet-cured-resin layer 42B of the seal face member 42 with the ink ribbon 52 positioned therebetween. That is, ultraviolet light emitted from the ultraviolet irradiation light source 70 reaches the ultraviolet-cured-resin layer 42B via the transparent plate 71 and the ink ribbon (negative film) 52.

The transparent plate 71 is adapted to enhance the degree of contact between the ink ribbon 52 serving as a negative film and the ultraviolet-cured-resin layer 42B when situated at a forward movement position (a position taken when the switch 12 designates activation of exposure), and not to obstacle the proceeding of the ink ribbon 52 when situated at the backward position.

To the ink ribbon 52, large pressing force is applied while depending on attachment structure of the seal 40. Accordingly, it is preferred that the ink ribbon 52 is formed by a sheet member having higher resistance to pressing force applied in the vertical direction than an ordinary sheet member commonly used in an ink ribbon.

Next, a general procedure which is executed by the user for producing a seal with the seal producing apparatus of this embodiment will be described.

Procedure 1: The user turns on the power by operating the switch 12, and then inputs imprint pattern information (a character string) by operating keys of the key input unit 11. Input of the imprint pattern information includes input of various attributes of the characters, such as styles of the characters, vertical writing vs. lateral writing, and character sizes, as well as input of the character string constituting the imprint image (Note that default attributes are already set even though attributes are not inputted.). Note that in the seal producing apparatus of this embodiment, input of imprint pattern information is allowed only when the seal 40 is mounted on the apparatus. Also, the allowable number of inputted lines and the allowable maximum character numbers of the respective lines vary depending on the types of the seal thus mounted.

Procedure 2: After completing the input of imprint pattern information, the user usually executes layout display by operating the layout display key in the key input unit 11 to verify whether or not the imprint image is desired. The CPU 21 of the seal producing apparatus executes, when the layout display key is operated, layout display of an imprint image by developing the input character string on the display buffer of the RAM 23 in accordance with the attributes associated with the input character string.

Procedure 3: After verifying that the imprint image is properly set, the user inserts the plate-making sheet 60 into the insertion hole 56 as far as the sheet 60 proceeds. Thereafter, the user executes a plate-making process by operating a plate-making key in the key input unit 11, thereby endowing the ink ribbon 52 with a function of a negative film. When the plate-making key is operated, the CPU 21 develops the inputted character string on the printing buffer in the RAM 23 in accordance with attributes associated with the character string. Thereafter, the CPU 21 drives the printing head 50 and the platen roller 51 to execute printing so as to prepare a negative film, which is conveyed to the position opposite to the seal face member 42.

Procedure 4: After completing the plate-making process, the user instructs exposure by operating the switch 12. At this occasion, the CPU 21 of the seal producing apparatus causes the liquid crystal display 33A to display a message inquiring whether the user performs exposure. When the execution key provided in the key input unit 11 is operated in response to this message, the CPU 21 activates the ultraviolet irradiation light source 70 to irradiate ultraviolet light onto the seal face member 42. After elapse of a predetermined irradiation time determined in accordance with the type of the attached seal 40, an exposure completion message is displayed and concurrently irradiation of the ultraviolet light emitted from the ultraviolet light irradiating source 70 is ceased. With this process, in the ultraviolet cured resin layer 42B of the seal face member 42, the portions corresponding to the imprint pattern are cured.

Procedure 5: After completing exposure, the user operates the switch 12 to instruct opening the cover member 65. When the cover member 65 is opened, the user takes out the seal 40 obtained after exposure. Thereafter, the user soaks the seal face member 42 of the seal 40 in a specific liquid (e.g., water) put in a vessel which preferably contains a brush therein. Then, the user moves the seal 40 reciprocatingly to wash the seal face member 42 so as to remove the portion not cured, thereby forming unevenness on the seal face member 42. Thus, the seal is produced.

One of the most conspicuous features of the seal producing apparatus according to the embodiment of the first and second inventions is that a slewing code, which has not been contained in a character string constituting imprint pattern information when layout display or plate making is instructed, is generated automatically or in accordance with an instruction issued by the user as one procedure executed in a plate making process or layout display process so that plate making or layout display can be executed.

As a case where such a slewing code is generated as one procedure executed in a plate making process or layout display process, (1) a case where an inputted character string contains a plurality of lines (corresponding to the first aspect of the present invention), and (2) a case where form input of a rectangular seal is instructed (corresponding to the second aspect of the present invention) can be mentioned. The processing executed at CPU 21 in these cases will be described in the following with reference to the attached drawings.

Under a state that an inputted character string is displayed, when the plate-making key or layout display key is operated, while not shown in the drawings, it is judged whether the input method is an ordinary input method or a form input method. When it is judged that the input method is an ordinary input method, the processing proceeds to the subroutine shown in FIG. 8.

The term "form input method" as used herein refers to an input method employed under particular input environment in which a seal face can be made in accordance with the specific use of a seal. For example, the form input method regarding a name seal is a method in which an input field associated with a family name and an input field associated with a first name are displayed separately, and the character string of the family name and the character string of the first name are inputted separately. In this case, when plate making or layout display is executed, an arrangement of the characters (an arrangement in which the portions of the family name and the first name are well balanced) are automatically determined in accordance with the numbers of the family name and the first name. In contrast, when the family and first names are inputted in an ordinary input method, the user must input a space additionally to indicate separation between the family and first names taking the balance between the portions of the family and first names into account, as well as inputting the character string of the family and first names.

Figure 8:
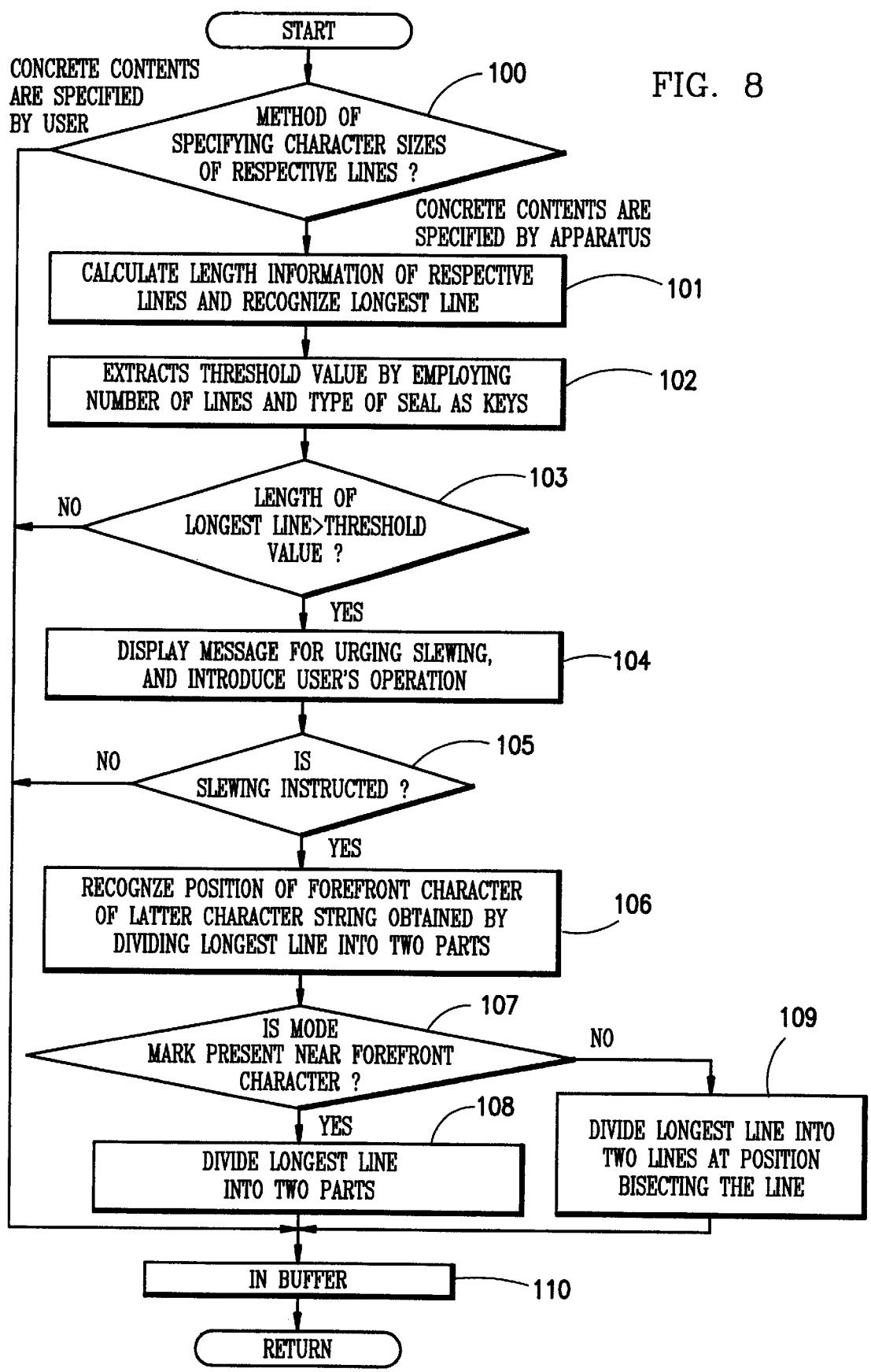
FIG. 8 is a flowchart of a first characteristic processing in a seal producing apparatus according to the first and second aspects of the present invention.

When entering the subroutine shown in FIG. 8, the CPU 21 judges the method of specifying the character sizes of the respective lines which is specified in association with the inputted character string (step 100). As the method of specifying the character sizes of the respective lines, a method in which the user specifies concrete character sizes, and a method in which the apparatus specifies the concrete character sizes can be mentioned. As the method in which the apparatus specifies concrete character sizes, a first method in which the same character size is allocated to all the lines based on the numbers of the lines and a length of the longest line, and a second method in which character sizes are allocated to the respective lines based on the number of lines and the difference in the length of the longest line so that the respective lines on the seal face member may have substantially the same length.

When the method in which the user specifies the concrete character sizes is adopted, the processing immediately proceeds to step 110 paying regard to the specification by the user.

In contrast, in the method in which the apparatus specifies concrete character sizes, the CPU 21 calculates length information of lengths of the respective lines, and recognize the longest line (step 101). The length information of the respective lines are obtained by, for example, assuming that the smallest character sizes of the respective lines are the basic character sizes of the respective lines and adopting the numbers of dots necessary for the respective lines as length information of the respective lines.

Thereafter, employing the number of lines of inputted character strings and the type of the mounted seal as keys, the CPU 21 extracts a threshold value (stored as a table in, for example, the ROM 22) for determining whether or not a slewing operation should be urged (step 102). Then, the magnitude of the length of the longest line and that of the threshold value are compared (step 103).

When the length of the longest lines is not longer than the threshold value, urging slewing operation is unnecessary, and eventually the processing immediately proceeds step 110 as described later.

In contrast, when the length of the longest line exceeds the threshold value, the CPU 21 causes the liquid crystal display 33A to display a message for urging a slewing operation, and judges whether the user instructs the apparatus to execute a slewing action or to keep the state as it is (steps 104 and 105).

When the user instructs the apparatus to keep the state as it is, the processing immediately proceeds to step 110 as later described because it is not necessary to execute adding slewing.

In contrast, when the user instructed the apparatus to execute a slewing action, the CPU 21 recognizes the position of the character situated at the forefront of the latter character string obtained by dividing the longest line into two parts (step 106). Also, the CPU 21 judges whether or not a mode mark exists in the vicinity of the position of the character situated at the forefront thus recognized at step 106 (step 107).

In the seal producing apparatus according to this embodiment, as to the attributes of the inputted character string, attributes regarding the entire inputted character string (e.g., with an outer frame, or vertical writing vs. lateral writing, etc.) and attributes regarding each character (e.g., calligraphic style, white character, etc.) can be set. The latter attributes, namely, attributes regarding each character are referred as "mode". When the user does not set a mode, a basic mode provided in the apparatus is set with respect to each character. When the user sets a mode, a mode mark is added (on the text data basis) before the characters to which the mode is set. The mode mark represents that the mode of the character string attached with the mode mark is different from that of the character string. immediately before the character string attached with the mode mark. It is a matter of course that the contents of the mode (attributes) corresponding to the mode mark are also stored. At step 107 described above, it is judged whether or not such a mode mark exists.

Further, it is judged whether or not a mode mark exists in the vicinity of the forefront character of the latter character string by, for example, utilizing the ratio between length information of the character string situated before the mode mark and length information of the character string situated behind the mode mark. Specifically, when the ratio falls within a range between 7.5:3.5 and 3.5:7.5, it is judged that a mode mark exists in the vicinity of the forefront character of the latter character string. Hereinafter, the ratio of this range is sometimes referred to as "vicinity condition".

If two or more mode marks exist in the vicinity of the forefront character of the latter character string, step 108 may be executed assuming that only the nearest mode mark is present. Alternatively, step 108 as later described may be executed assuming that only the most forward mode mark of the mode marks situated in the vicinity of the forefront character of the latter character string. Still alternatively, step 109 as later described may be executed assuming that no mode mark is present in the vicinity of the forefront character of the latter character string.

When a positive judgment is made at step 107, the CPU 21 inserts a slewing code immediately before the mode mark (step 108; see FIGS. 10A–10C and 11A–11C as later described). On the other hand, when a negative judgment is made at step 107, the CPU 12 inserts a slewing code at a position which divides the longest line into two parts (if the line contains, an odd number of characters and the line cannot be divided into equal two parts, the length of the former character string is made longer) (step 109). At step 109 as well, all the mode information having been set to the latter character string is inherited as it is to the further latter character string obtained by slewing the latter character string (see FIGS. 12A–12C as later described).

After a series of processing of adding slewing (steps 100 to 108, or steps 100 to 109) is executed, character information is developed in the print buffer for printing action or in the display buffer for layout display (step 110).

Note that the slewing code added at step 108 or 109 remains in character string information even after plate making or layout display is completed and an ordinary input screen is restored.

Figures 9A, 9B:
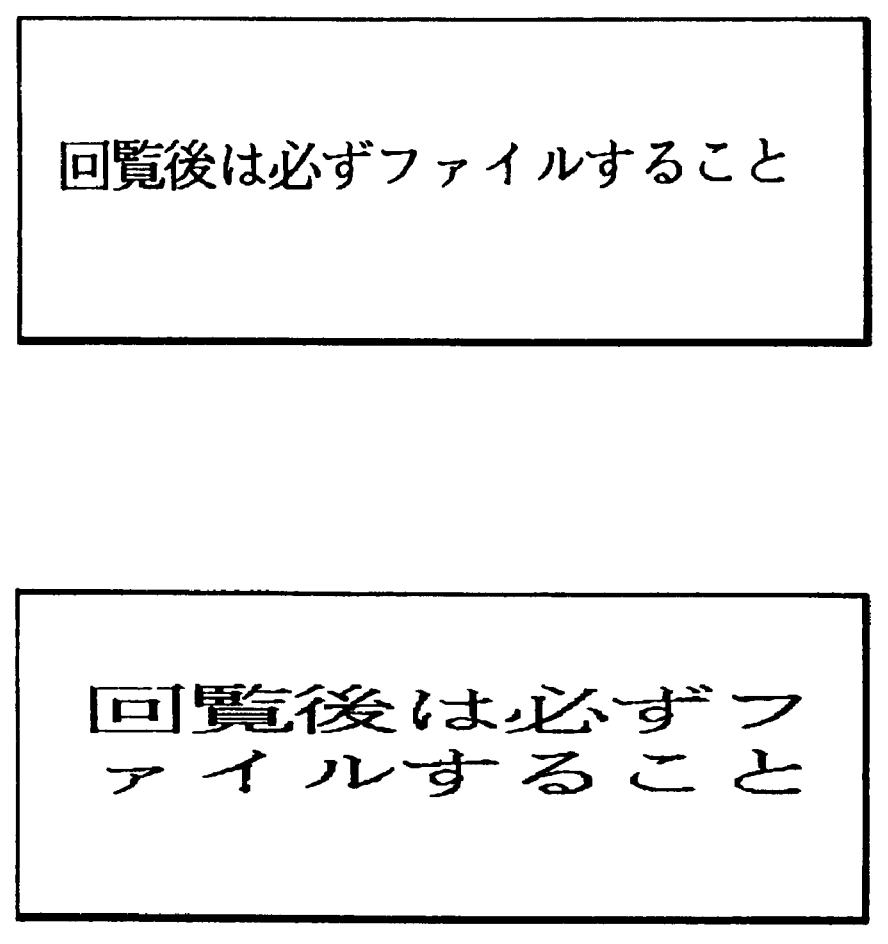

FIG. 9(A) shows a resulting plate obtained through a plate making process in which the inputted character string information (with no mode mark) is used as it is. FIG. 9(B) shows a resulting plate obtained through a plate making process in which the CPU 21 urges the user to select automatic slewing and the user selected the automatic slewing. As is known from the comparison between these drawings, with respect to a character string containing a large number of characters, a more preferable imprint pattern can be obtained by executing automatic slewing. Note that, the imprint pattern as shown in FIG. 9(B) can be obtained through a process in which the user designates slewing voluntarily before instructing execution of plate making. However, the above-mentioned automatic slewing function enables the user to obtain the imprint pattern as shown in FIG. 9(B) even when the user forgets to instruct such a slewing action.

Figure 10C:
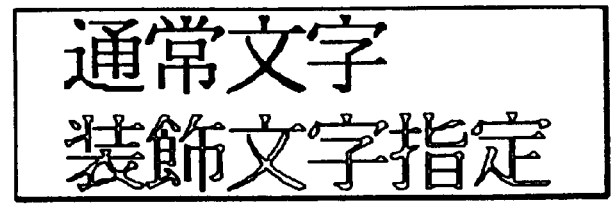

FIG. 10(A) shows text data in the case where the inputted character string contains ten characters and a mode instructing the characters from the fifth character must be displayed in the form of a white letter is set. Note that the character sizes of all the characters are set to be the same and that the black triangle denotes a mode mark. When the user selects automatic slewing with respect to this inputted character string, since the mode mark exists in the vicinity of a forward portion with respect to the character "飾" situated at the forefront of the latter part of the inputted character string obtained by bisecting the length information of the inputted character string (i.e., since the ratio between the length information of the character string situated before the mode mark and the length information of the character string situated behind the mode mark is 4:6.3, which satisfies the above-mentioned vicinity condition), as shown FIG. 10(B), the text data are changed so that the inputted character string may be divided into two lines before and behind the mode mark, and the resulting plate obtained after a plate making process exhibits such a form as shown in FIG. 10(C). Note that the white character become larger by 5% than an ordinary character, and therefore the length information of the white character becomes 6.3.

Figure 11C:
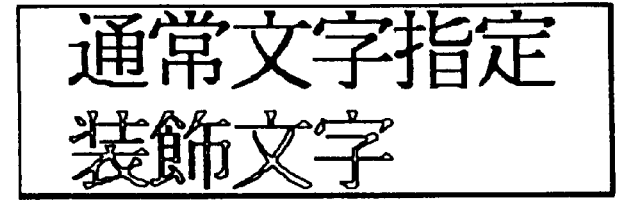

FIG. 11(A) shows text data in the case where the inputted character string contains ten characters and a mode instructing the characters from the seventh character to be displayed in the form of a white letter is set. Note that the character sizes of all the characters are set to be the same. When the user select an automatic slewing action with respect to this inputted character string, since the mode mark exists in the vicinity of a backward portion with respect to the character "定" situated at the forefront of the latter part of the inputted character string obtained by bisecting the length information of the inputted character string (i.e., since the ratio between the length information of the character string before the mode mark and the length information of the character string behind the mode mark is 6:4.2, which satisfies the above-mentioned vicinity condition), as shown FIG. 11(B), the text data is changed so that the inputted character string may be divided into two lines before and behind the mode mark, and the resulting plate obtained after a plate making process exhibits such a form as shown in FIG. 11(C).

Figure 12C:
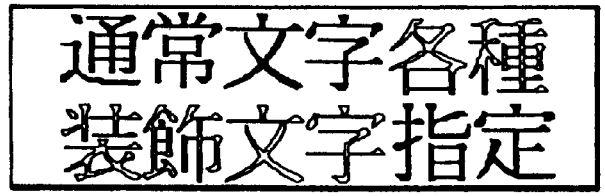

FIG. 12(A) shows text data in the case where the inputted character string contains twelve characters and a mode instructing that the characters from the fifth character is displayed in the form of a white letter is set and a mode instructing that the characters from the eleventh character is displayed not in the form of a white letter but in the form of an ordinary character (i.e., restore ordinary character) are set. Note that the character sizes of all the characters are set to be the same. When the user selects an automatic slewing action with respect to this inputted character string, since no mode mark exists in the vicinity of a forward portion with respect to the character "装" situated at the forefront of the latter part of the inputted character string obtained by bisecting the length information of the inputted character string, (i.e., since the ratio associated with the former mode mark is 4:8.3, and the ratio associated with the latter mode mark is 10.3:2, and accordingly neither of the ratios satisfy the above-mentioned vicinity condition), as shown FIG. 12(B), the text data of the inputted character string is changed into text data of two lines such that the characters situated on and after the character "装" situated in the second line, and moreover the character string situated at the second line maintains the mode before the automatic slewing is executed, and the resulting plate obtained after a plate making process exhibits such a form as shown in FIG. 12(C).

Figure 13:
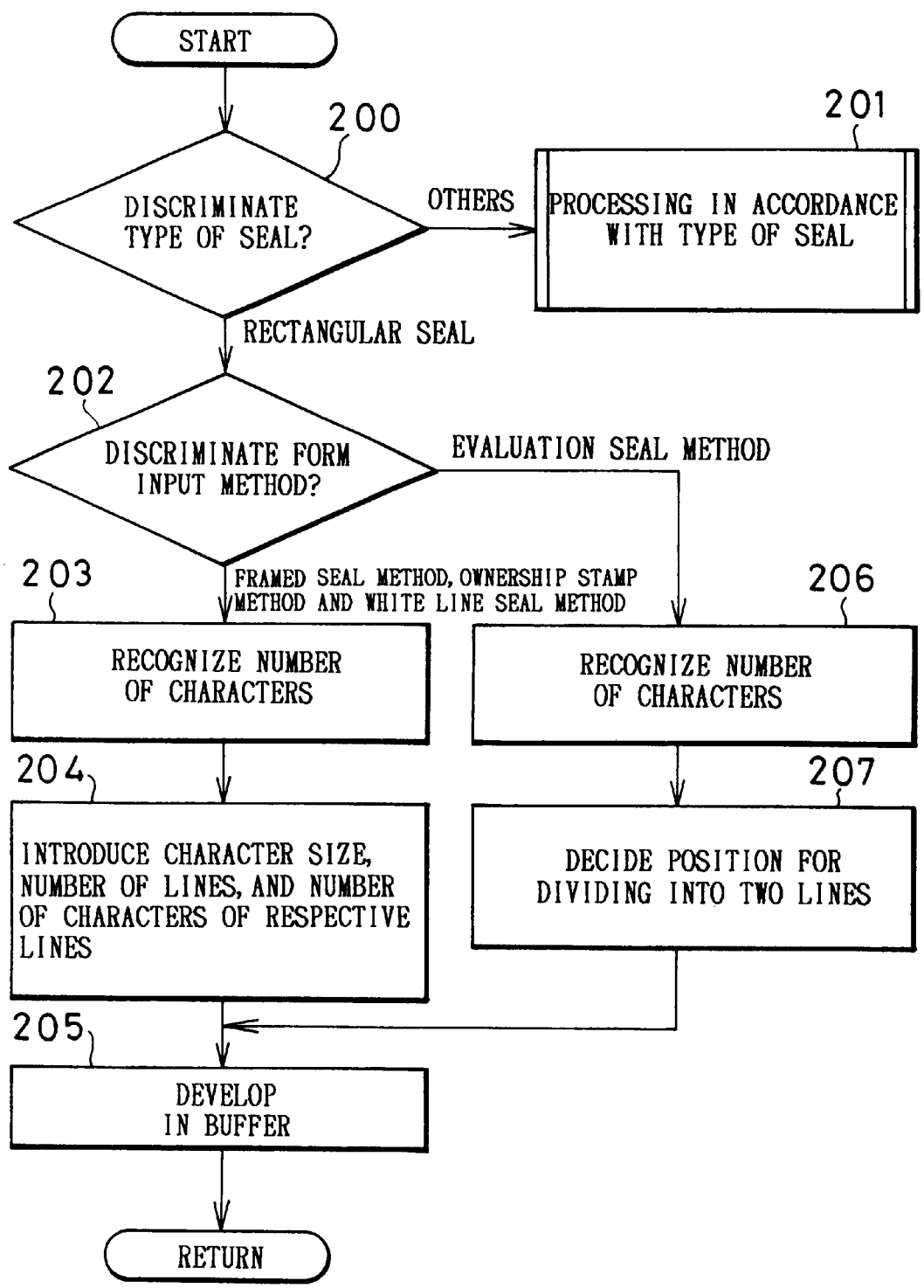
FIG. 13 is a flowchart of a second characteristic processing in a seal producing apparatus according to the first and second aspects of the present invention.

Next, with reference to FIG. 13, explanation is made as to processing executed by the CPU 21 when the plate making key or a layout display key is operated under a state that form input method is executed with respect to a rectangular seal.

Under the state that an inputted character string is displayed, when the plate making key or a layout display key is operated, while not shown in the drawings, first it is judged whether the input method is an ordinary input method or a form input method, as described above. When it is decided that the form input method is adopted based on the judgment, the processing proceeds to the subroutine shown in FIG. 13.

After entering the subroutine shown in FIG. 13, the type of the seal associated with the form input method is judged (step 200). When the seal is not a rectangular seal, processing associated with the type of the seal is executed (step 201). In this embodiment, characteristic features lie in the processing associated with a rectangular seal, and therefore detailed explanations are omitted with respect to other types of seals.

When the type of the seal associated with the form input method is a rectangular seal, the CPU 21 judges which form input method is selected with respect to the rectangular seal (step 202).

As a form input method associated with a rectangular seal, this embodiment provides four methods, namely, a framed seal method, an ownership stamp method, a white line seal method, and an evaluation seal method.

The framed seal method is one of the form input methods in which the user simply inputs characters having a number falling within an allowable range (e.g., up to 16 characters). The seal prepared by this method has a frame.

The ownership stamp method is one of the form input methods in which an input field already containing the character string "蔵書" (private library) is displayed to allow the user to input another character string. In the ownership stamp method, the user does not need to input slewing, either. Also, limitation is imposed on the number of characters including the characters "蔵書".

The white line seal method is a one of the form input methods in which a seal having a seal face formed with an engraved character string is produced. With respect to input of characters, the white seal method employs the same inputting procedure as the framed seal method.

The evaluation seal method is one of the form input methods in which a type of evaluation such as "大変よくできました" (excellent) is selected by the user, and an input field already containing the character string associated with the selected evaluation type (e.g., "大変よくできました") is displayed to allow the user to input an additional character string. In the evaluation seal method, the user does not need to input slewing, either. Also, limitation is imposed on the number of characters. The imprint of the seal prepared by this method consists of a picture symbol and the character string associated with the selected evaluation type.

When the framed seal method, ownership stamp method, or white line method is adopted as a form input method for a rectangular seal, the CPU 21 recognize the number of characters, and extracts information of the character size, the number of lines, the numbers of characters of the respective lines out of a table already provided in the ROM 22 by employing the recognized number of characters as a key (steps 203 and 204). Then, the CPU 21 develops the inputted character string in the print buffer (when plate making is executed) or display buffer (when layout display is executed) (step 205).

FIG. 14 shows an example of the configuration of a table used at this occasion. The letters "H", "G" and "M" show character sizes, respectively, which become smaller in the order of mention. "縮縮 H" (reduced-reduced H) and "縮縮 G" (reduced-reduced G) represent character sizes obtained by reducing the characters "H" and "G" in the sub-scanning direction by two stages, respectively. "縮 M" (reduced M) represents a character size obtained by reducing the character "M" in the sub-scanning direction by one stage. For example, if an inputted character string has nine characters, the character string is developed into three lines each having three characters in the character size of "M" in the buffer. Thus, slewing processing is automatically executed when the buffer development is executed.

In contrast, when the evaluation seal method is adopted as a form input method, the CPU 21 recognizes the number of characters and decides a position for dividing the inputted character string into two lines in accordance with the number of characters thus recognized (steps 206 and 207). Then the CPU 21 develops the inputted character string and picture symbols representing evaluation in the print buffer or display buffer (step 205).

As described above, with respect to the character string to which the form input method for a rectangular seal is applied, the character string is developed in the buffer into a single or plural lines according to the number of the characters without executing any slewing operation performed by the user.

According to the above embodiment of the first and second aspects of the present invention, where the number of characters is large or where the form input method is applied to a rectangular seal, even though slewing is not executed at the time of character input, slewing action is executed automatically or by the user input when the character string is developed into dot patterns at the time of plate making or layout display. With this configuration, the operation at the time of inputting a character string does not become complicated, and the imprint pattern of the completed seal gives a natural impression.

In the above embodiment, when the number of characters are large, only the longest line out of the lines each having a number of characters larger than a threshold number of characters urges slewing. However, it is a matter of course that all the lines each having number of characters larger than a threshold value may urge slewing.

In the above embodiment, when a line having a number of characters larger than a threshold number is present, the user is inquired of whether or not the user performs slewing. Alternatively, insertion of slewing (dividing the character string into two parts) may be automatically executed without any user's verification.

In the above embodiment, the mode mark was stored in the text area. However, the first and second aspects of the present invention can be applied to the apparatus in which the attributes of each character (mode) is managed in a storing area other than the text area. In this case as well, control of adding slewing is executed depending on the position where the mode is changed (set).

Further, in the above embodiment, the automatic slewing action is executed only when the form input method is applied to a rectangular seal. However, the automatic slewing action may be executed when the form input method is applied to the other types of seal. Alternatively, the automatic slewing action may be executed when the other input methods are employed. For example, in the case where the seal face member is divided into a plurality of rectangular areas and an inputted character string is inputted for each divided area, with respect to one or more areas the characters may be arranged automatically in accordance with the total number of the characters. In this case, even when an instruction of executing slewing with respect to the character string is issued, automatic arrangement of the characters according to the total number of characters may be executed disregarding such an instruction.

Moreover, in the above embodiment, information on the character sizes, the number of lines, the numbers of the characters in the respective lines which must be determined are taken out of the storage table. However, they may be determined through an arithmetic operation executed based on a predetermined operation expression previously provided. Alternatively, there may be employed a method in which the number of lines and the numbers of characters in the respective lines are taken out of the table and the character size is determined through arithmetic operation.

In the above embodiment, while the first and second aspects of the present invention are applied to a seal producing apparatus in which unevenness is formed on the seal face member, the method of forming unevenness on the seal face is not limited to that disclosed in this embodiment. Further, the first and second aspects of the present invention may be also applied to a seal producing apparatus in which the seal face member is treated so that ink may ooze partially to form an imprint on a sheet. In this case, it is necessary to execute the processing shown in FIG. 8 or FIG. 13 when it is requested to treat the seal face member so that ink may ooze partially to form an imprint on the sheet as well as when layout display is executed. Moreover, the first and second aspects of the present invention can be also applied to an apparatus for processing character information in which a printed or transferred medium has such limitation regarding the arrangement of characters as imposed on the seal face member. Taking a tape printing apparatus as an example, since the printed medium is a tape, the number of lines is limited, but in most cases no limitation is imposed on the numbers of characters of the respective lines. However, in the case where input of a character string must be performed under the state that the length of the tape is limited, limitation is imposed on the numbers of the characters at the respective lines. To such a case, the above-mentioned technological thought according to the first and second aspects of the present invention can be applied.

Next, an embodiment of a seal producing apparatus to which an apparatus for processing character information according to the third and fourth aspects of the present invention is applied will be described in detail with reference to the attached drawings.

Figure 7:
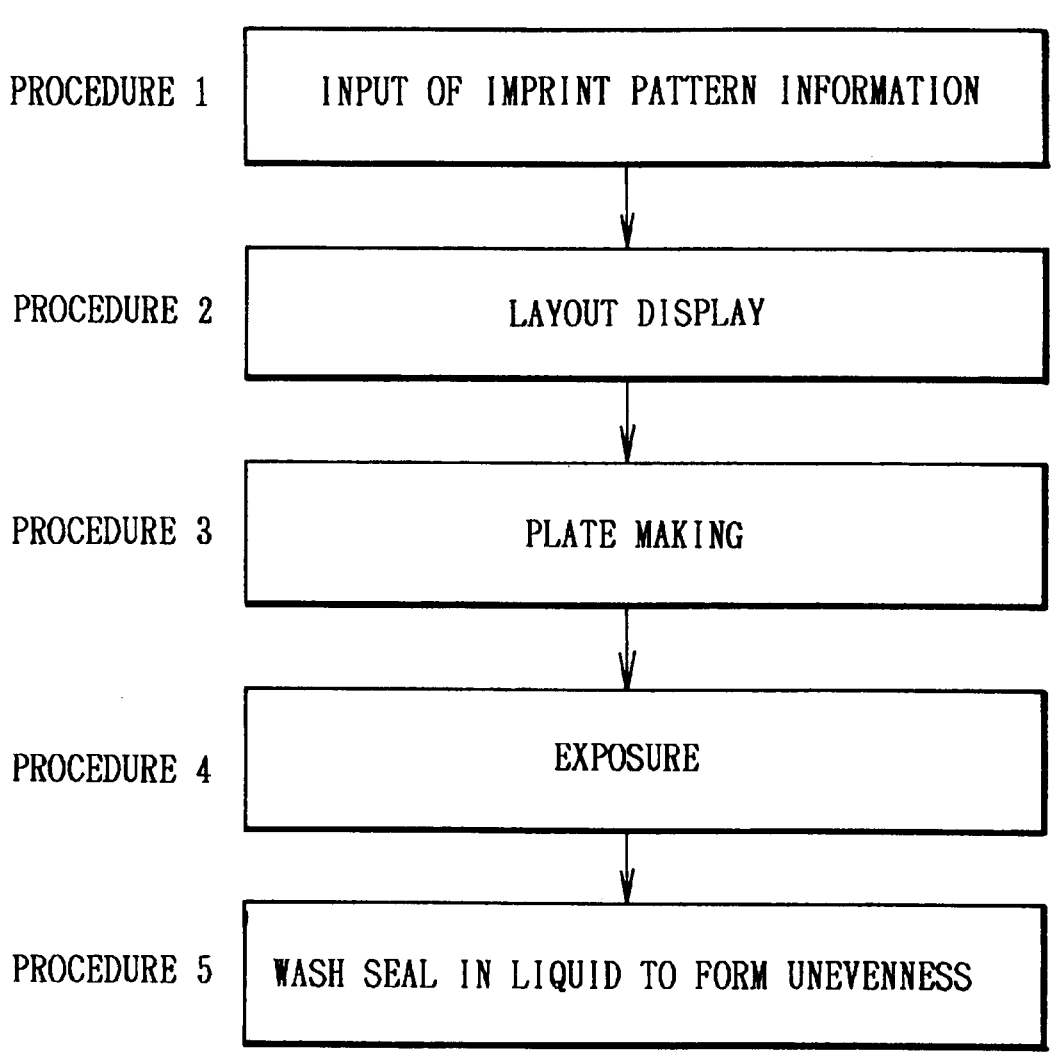
FIG. 7 is a flow chart showing a procedure for producing a seal.

In the seal producing apparatus according to this embodiment, the configuration of the electrical mechanism (including an information processing unit and an imprint transfer control unit) is configured as shown in FIG. 1. Also, the mechanical-optical mechanism (including a printing unit and a light irradiating unit) and the seal are also configured as shown in FIG. 2, and the outer appearance of the seal producing apparatus is configured as shown in FIG. 3. Further, the dial key section 11B, the display unit 33, and the plate making sheet 60 are also configured as shown in FIGS. 4, 5, 6A and 6B, respectively. Furthermore, the procedures performed by the user is executed as shown in FIG. 7. Accordingly, the detailed description of these features are omitted. In the following description of the third and fourth aspects of the present invention, the reference numerals used in the description of the embodiment according to the first and second aspects of the present invention are also applied appropriately.

The main feature of the embodiment according to the third and fourth aspects of the present invention is that limitation is imposed on the number of inputted characters of respective lines (the number of positive characters). Various processing programs associated with this main feature (see FIGS. 15, 16 and 18) are stored in the ROM 22, and processed by the CPU 21.

Figure 15:
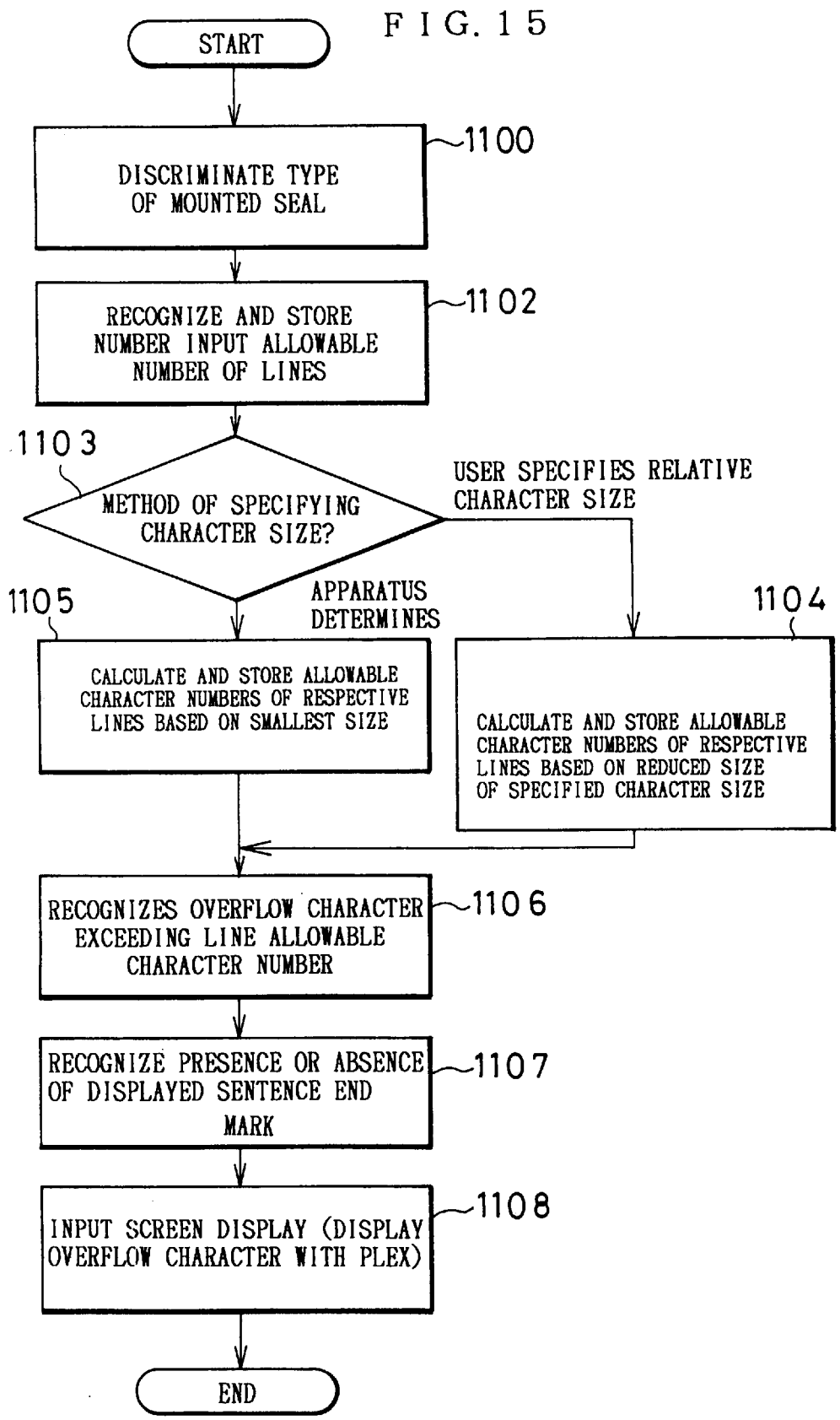
FIG. 15 is a flowchart of a sequence of processing, including processing of deciding allowable character numbers of the respective lines in an embodiment of a seal producing apparatus according to the third and fourth aspects of the present invention.

Referring to the flowchart in FIG. 15, a series of processing including processing of deciding allowable numbers of the respective lines. Entry to the processing in FIG. 15 is made immediately after the power is applied and the mounted seal is replaced, or immediately after alteration of the attributes associated with the entire inputted character string (for example, character sizes for the respective lines)is made.

The CPU 21 first discriminates the type of the mounted seal (step 1100). Then the CPU 21 recognizes the allowable number of lines determined based on the type of the seal thus recognized and stores the allowable number of lines in a predetermined buffer (step 1102). The allowable number of lines is utilized when it is judged whether or not a new line can be formed when an instruction of slewing is issued.

Thereafter, the CPU 21 discriminates the methods of specifying the character sizes of the respective lines based on information on the attributes associated with the entire inputted character string which is valid at that time (the default attributes immediately after the power is supplied, while updated ones after the contents of the attributes are updated) (step 1103). As a method of specifying a character size, roughly speaking, a method in which the user specifies relative character sizes (large, medium and small sizes), and a method in which the apparatus automatically determines the character size.

In the former method, the CPU 21 calculates with respect to each line how many characters of a reduced character size can be accommodated in the area in which characters are printed, and stores the number of characters thus calculated as a allowable number of characters with respect to the line concerned (step 1104). Here, the reduced character size is the smallest character size of all the character sizes allowed at the time of printing, and is obtained by reducing a basic character size in the sub-scanning direction. Also, the basic character size is an absolute character size obtained by converting a specified relative character size in accordance with the type of the seal.

In the latter method, the CPU 21 calculates how many characters of the smallest character size allowed by the apparatus can be accommodated in the area in which characters are printed, the area being determined according to the type of the seal, and stores the number of characters thus calculated as an allowable number associated with all the lines (step 1105).

Thereafter, the CPU 21 recognizes, based on the character position within a text area represented by a cursor position pointer, a line-character-number-pointer representing the number of characters already inputted in a line, a line allowable character number, etc., whether or not a character which overflow the line allowable character number and is to be displayed with plex (hereinafter referred to as "overflow character") is present (step 1106). Further, it is judged, based on the character position in the text area represented by the cursor position pointer, a total character number pointer representing the total number of the already inputted characters, and a allowable total character number which is fixedly set by the apparatus, whether or not the mark at the end of the sentence is necessary (step 1107). Then the display is changed to the character input screen by operating the display buffer (not shown) in the RAM 23 based on the contents stored in the text area (step 1108). At this occasion, the overflow character is displayed as a positive character with plex. When a character of the same order as the allowable total character number is displayed at the fifth display area 33A-5 (display area for the cursor) of the liquid crystal display 33A, a sentence end mark is displayed at the sixth display area 33A-6 of the liquid crystal display 33A.

As described above, with respect to the inputted characters overflowing an allowable character number set for each line, plex display is executed to urge the user to instruct a slewing action.

Figure 16:
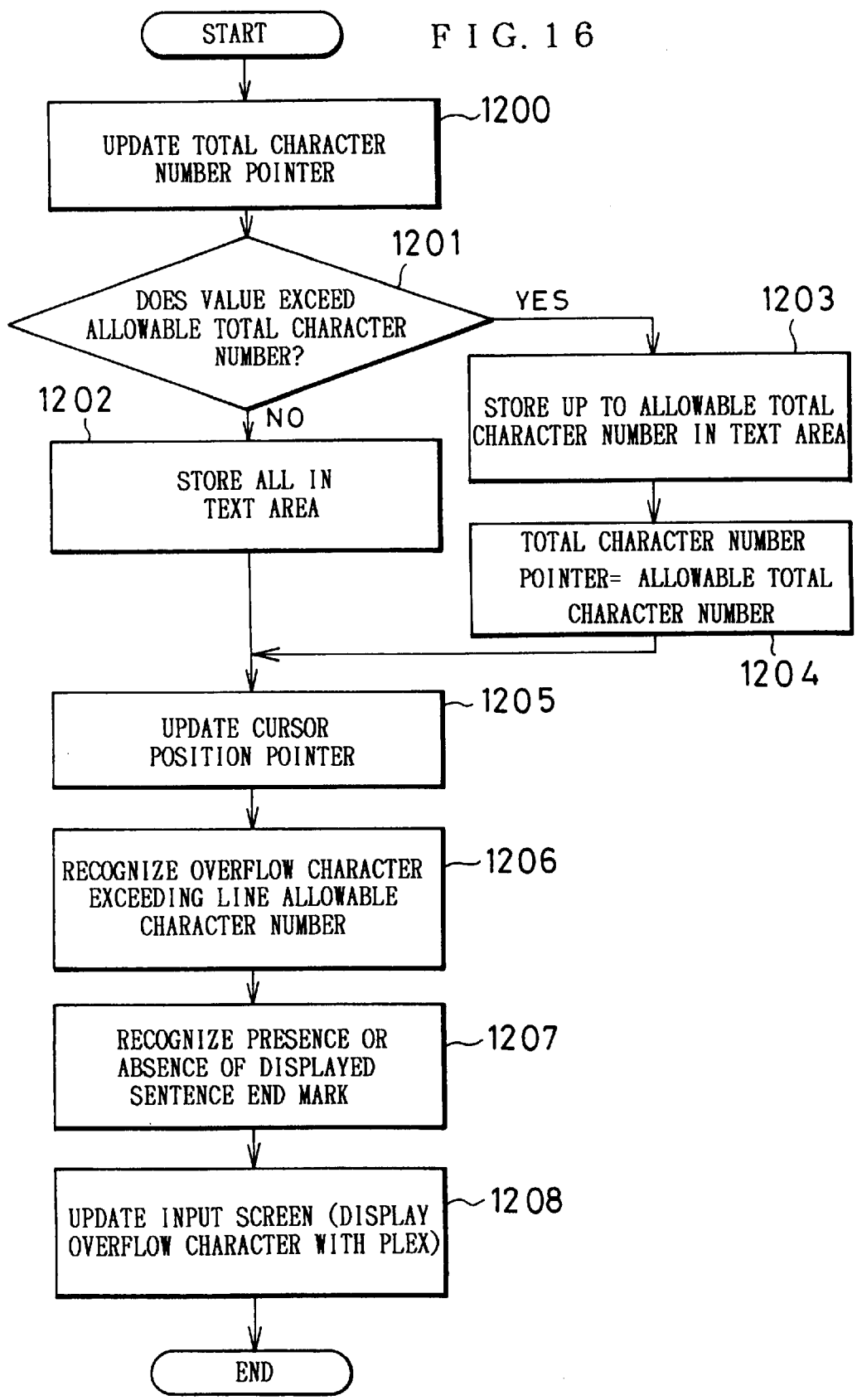
FIG. 16 is a flowchart of processing executed when the number of characters in an embodiment of a seal producing apparatus according to the third and fourth aspects of the present invention.

FIG. 16 is a flowchart of the processing executed when an operation signal for changing the number of characters stored in the text area (the number of positive characters) is supplied. Entry to the processing shown in FIG. 16 is made, for example, when the selection key 80 is operated under the state that a numeric character or an alphabet is displayed as a flashing character (input candidate character), when the selection key 80 is operated for selecting the kanji obtained by conversion in a kana-kanji converting action, or when the nonconversion key 81 is operated under the state that a negative character (tentatively determined character) is displayed.

In this embodiment, it is assumed that a buffer for storing a flashing character representing an input candidate character designated by the selection dial 85, a buffer for storing a negative character (tentatively determined character) which may be changed into kanji, and a buffer for storing kanji candidate for conversion are provided separately from the text area for storing positive characters (determined characters or semi-determined characters).

The CPU21 first updates the total character number pointer by the same number as the increased number of positive characters at this time (step 1200), and judges whether or not the value thereof exceeds the allowable total character number (step 1201). If the value is not larger than the allowable total character number, the character information concerned is transferred from a predetermined buffer to the text area and stored therein (step 1202). If the value exceeds the allowable total character number, a part or all of the character information concerned is transferred from a predetermined buffer to the text area and stored therein up to the allowable total character number (1203), and the value of the total character number pointer is updated to the allowable total character number (step 1204). Thereafter, the cursor position pointer is updated by the number of characters added to the text area (step 1205).

In the processing at step 1203, if the character which is transferred and added to the text area is situated at the tail of the text area, the number of characters stored in the text area is made to be the same as the allowable total character number by expelling some characters from the text area. If the character is transferred and added to the text area at a position in the middle of the character string already stored (i.e., if the character is inserted), all the transferred characters are stored, and concurrently some characters situated at the tail of the text area are expelled from the text area, thereby making the number of characters in the text area equal to the allowable total character number.

Thereafter, the CPU 21 recognizes, based on the character position within a text area represented by a cursor position pointer, a line-character-number-pointer representing the number of characters already inputted in a line, a line allowable character number, etc., whether or not a character which exceeds the line allowable character number and is to be displayed with plex (hereinafter referred to as "overflow character") is present (step 1206). Further, it is judged, based on the character position in the text area represented by the cursor position pointer, a total character number pointer representing the total number of the already inputted characters, and a allowable total character number which is fixedly set by the apparatus, whether or not the mark at the end of the sentence is necessary (step 1207). Then the display is changed to the character input screen by operating the display buffer (not shown) in the RAM 23 based on the contents stored in the text area (step 1208).

As described above, every time the number of positive characters are changed, it is verified whether or not plex display with respect to the positive character is executed and whether or not display of the sentence end mark is executed.

Note that, when slewing is employed to change the number of characters of the object line, it is also verified in the same manner as described above whether or not plex display with respect to the positive characters is present, or whether or not display of sentence end mark is executed. Specifically, while the flowchart is not shown, after setting the line character number pointer to an initial value, with respect to the new line, processing similar to that at steps 1205 to 1208 is executed.

FIGS. 17A–17E are views showing the relationship between the number of inputted characters and the displayed content. FIG. 17(*a*) shows the content immediately after inputting characters (positive characters) whose number is the same as the line allowable number of characters. In the state shown in FIG. 17(*a*), when the character selection dial 85 is operated and the character "Z" is selected as an input candidate character, and thereafter the selection key 80 is operated, the character "Z" becomes a character exceeding the line allowable character number. Accordingly, as shown in FIG. 17(*b*), such a character is displayed with plex. It is preferred slewing action is performed here. Assume that at first the displayed state is as shown in FIG. 17(*b*), and then no slewing action is operated and characters are inputted sequentially to reach the number of (the allowable number −1), so that the displayed state becomes one as shown in FIG. 17(*c*). Here, assume that the input mode is changed into a hiragana input mode, and four characters "あいうえ" are inputted as negative characters. When these four characters are included in counting, the number of characters in total exceeds the allowable total character number. However, the character string "あいうえ" has a possibility of being converted into a kanji of one character, and therefore the character string "あいうえ" is accepted and displayed in a negative mode as shown in FIG. 17(*d*). Under this state, the noncoversion key 81 is operated, display of the character string "あいうえ" is converted into a positive display. In this case, it is determined that the number of characters exceeds the allowable total character number, so that the characters "あいうえ" are deleted, and a sentence end mark is displayed.

Figure 17:
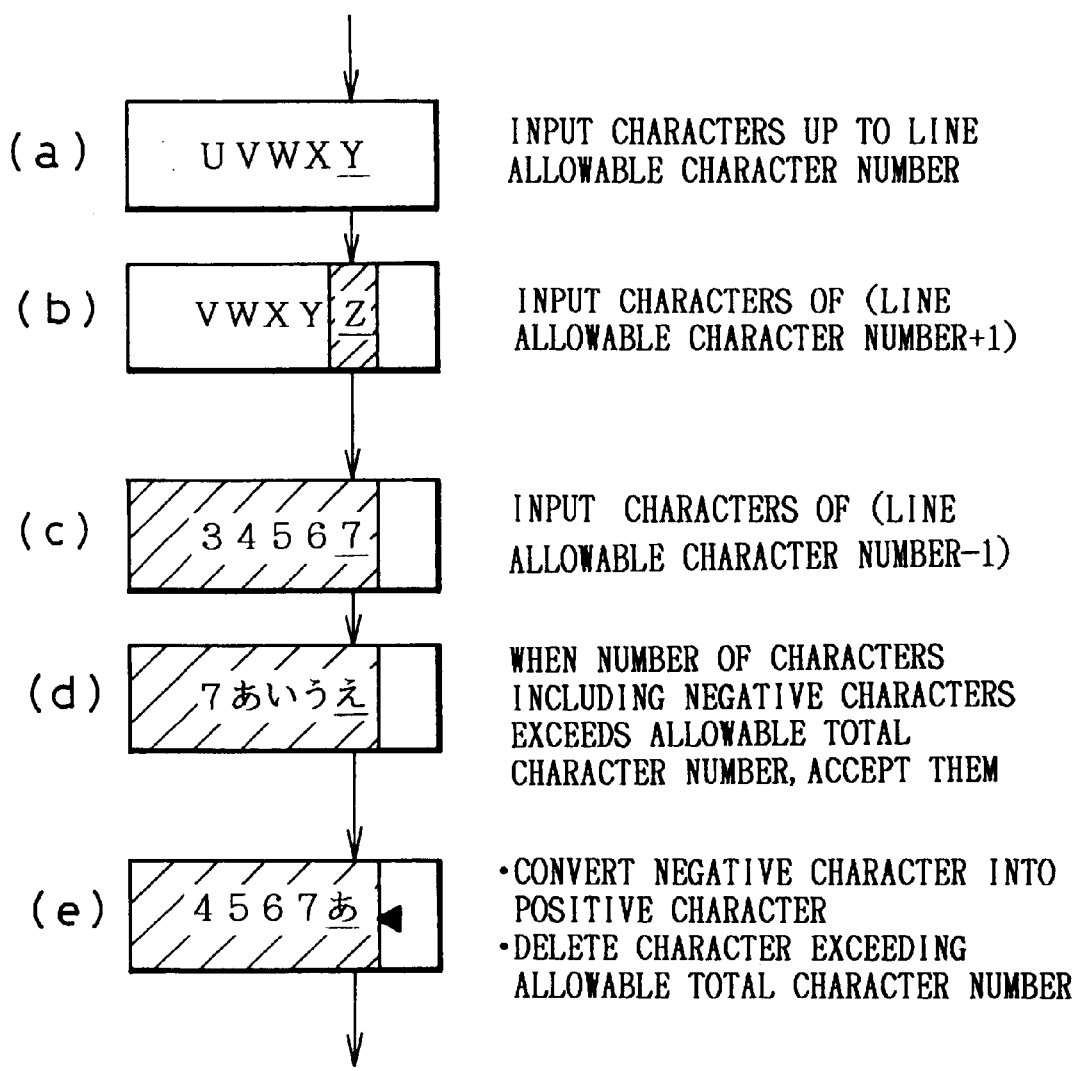
FIGS. 17A, 17B, 17C, 17D and 17E are views illustrating relationships between numbers of input characters and displayed contents.

Under the state as shown in FIG. 17(*e*), the apparatus neglects the instruction of inputting the candidate character issued by the character selection dial 85, and strongly notifies the user of the end of the sentence. Note that, under the state that the cursor is moved leftward relatively, even when the total number of inputted characters are equal to the allowable total character number, input candidate character is accepted. When the input candidate character thus accepted is converted into a positive character, the positive character on the sentence end side is made to overflow.

Thus, the processing relating to the limitations with respect to the total character number and the line character number has been described above. However, processing for restricting the number of inputted characters is not limited thereto.

For example, under the state of compound word registration, the number of characters which can be registered (for example, 5 letters) and the number of characters used for the reading of the registered word (for example, 16 letters) are determined. Further, when a form input method, which is provided for facilitating the production of a seal for a specific use, is employed, there are some cases in which the number of characters are limited. When the form input method used for producing a name seal, it is configurated such that the inputted characters of the family name and the inputted characters of the first name are introduced separately, and the allowed number of characters for each is determined. Under the state that limitation is imposed on the number of input characters, when an inputting operation is performed, "[" and "]" are displayed so as to clearly show the input field to which characters can be inputted.

Figure 18:
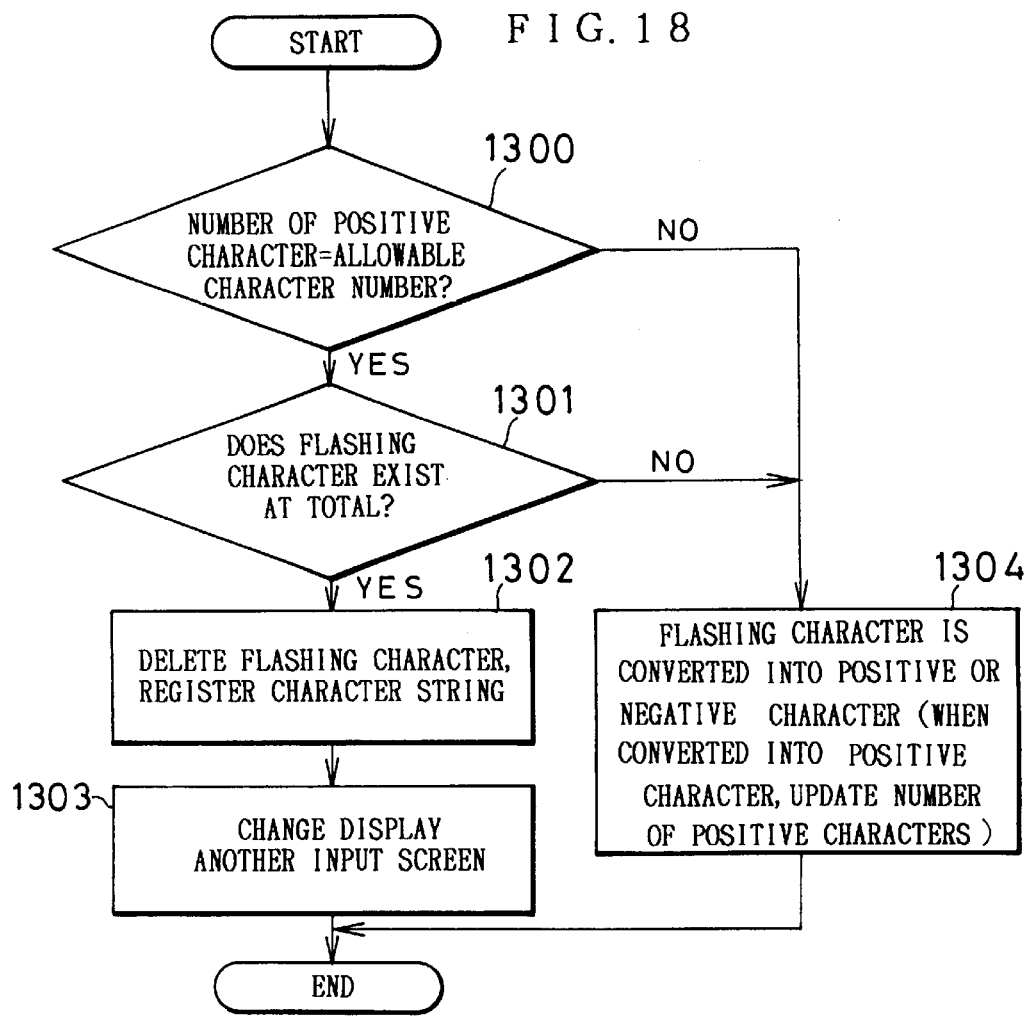
FIG. 18 is a flowchart of processing for registration of a character string to the apparatus executed when a flashing character exists in a seal producing apparatus according to the embodiment of the third and fourth aspects of the present invention.

FIG. 18 is a flowchart of processing executed when the selection key 80 is operated under the state that a flashing character (input candidate character) is present in the case where limitation is imposed on the input character number.

First, the CPU 21 judges whether or not the number of already inputted characters (the number of positive characters) is equal to the allowable character number (step 1300). When a positive result is obtained at this step, the CPU21 judges whether or not the flashing character exists at the tail, that is, whether or not an action of inserting a character is executed in the middle of the character string (step 1301). When a positive result is also obtained at this step, the character string from which the flashing character is removed is stored in a specific area (step 1302), and the display is changed into another input screen (step 1303).

For example, when a registered compound word is inputted, if a positive result is obtained at step 1302, the character string from which flashing character is removed is stored in the storing area (not working area) for registered compound words, and input screen for introducing the reading of the registered compound word is displayed.

When a negative result is obtained at the above-mentioned steps 1300 and 1301, the flashing character is converted into a positive character or a negative character so as to be stored in the working area in which the inputted character string is introduced, and the display is updated (step 1304). At this occasion, when conversion to a positive character is executed, the number of characters is updated (provided that the upper limit is the allowable character number). As a result of conversion to positive characters, if the positive characters come to exceed the allowable character number, the positive characters exceeding the allowable character number is erased from the input character string.

When the number of characters exceeds the allowable character number, the input of candidate character from the character selection dial 85 can be prohibited. However, it is practical that insertion in the middle of the character string is allowed even when the number of characters reach the allowable character number, and the character at the tail is deleted. When the apparatus is thus configured, from the standpoint of program configuration, it is preferred that input character string (flashing character) sent from the character selection dial 85 is accepted even after the number of inputted characters reach the allowable character number whether or not insertion is executed in the middle of the character string. In this case, it is not allowed to add a character to the tail of the character string (because the flashing character at the tail of the character string is erased even after it is finally converted into a positive character). In view of this point, when the selection key is operated, the selection is not treated as a selection of an input candidate character but as a selection for registration of a determined positive character string.

Figure 19:
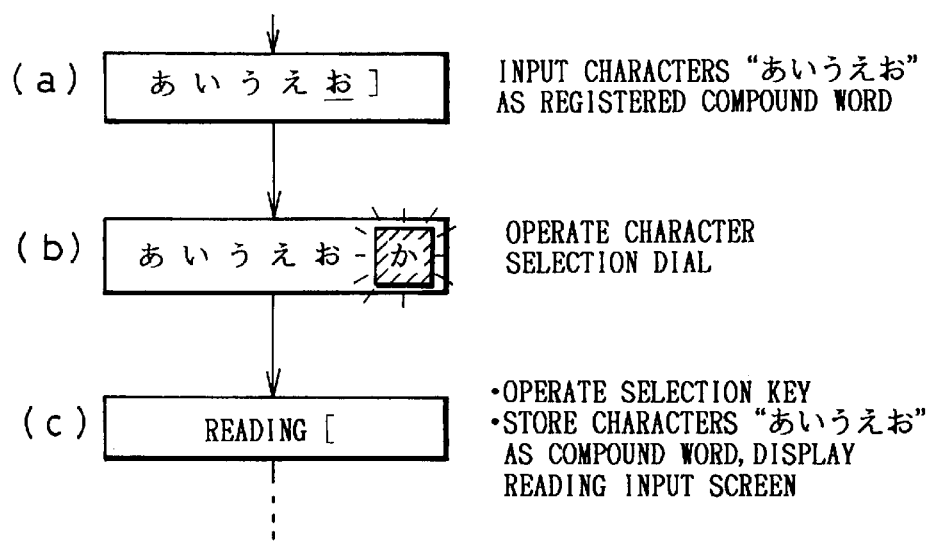
FIGS. 19A, 19B and 19C are views showing relationships between the input state of a registered compound word and the displayed contents.

FIGS. 19A–19C are views is a view illustrating the relationship between input operation of registered compound word and the displayed contents. FIG. 19(*a*) illustrates the displayed content immediately after characters (positive characters) "あいうえお" whose number is the same as the allowable character number of a registered compound word is inputted. In this display state, when the character selection dial 85 is operated by one unit angle, the character "か" is displayed in a flashing manner as shown in FIG. 19(*b*). Here, it can be configured such that when the selection key 80 is operated, the flashing character is converted into a negative character. However, since the number of characters exceeds the allowable character number and inputting a character to the tail of the character string is instructed, the instruction is not treated as an instruction of conversion to a negative character, but as an instruction of determining the selection of the registered compound word. Then the character string "あいうえお" excluding the flashing character "か" is stored in the storage area for registered compound words and then a screen for inputting the reading thereof is displayed as shown in FIG. 19(*c*).

According to the embodiment described above, allowable numbers of characters are determined for the respective lines in accordance with the types of seal and the character sizes specified for the respective lines. Also, when the input character number exceeds the allowable character number of the line, the characters exceeding the allowable character number and the characters under the allowable character number are displayed in different display manners. With this configuration, the user can recognize the propriety of the inputted characters at the stage of character input executed before the print or the layout display is activated, and can cope with the situation appropriately by executing slewing or the like.

Further, according to the above embodiment, where the number of characters to be inputted is limited as in the case of registering and storing registered word, under the state that the number of inputted determined character number is equal to the limited character number and that the input candidate character exists at the tail of the determined character string, when an instruction of registering the character string is issued, the determined character string already inputted excluding the input candidate character is registered. With this configuration, even where the user mistakenly inputs a candidate character after inputting a required character string up to the limited number, there is no need to execute operations of deleting the character and then issuing an instruction for registering, so that operability is greatly enhanced.

In the above embodiment, the third and fourth aspects of the present invention are applied to the seal producing apparatus. However, the apparatuses to which the third and fourth aspects of the present invention are applied is not limited thereto, and alternatively can be applied to other character input apparatuses, such as a tape printing apparatus. The technological thought that limitation is imposed on the numbers of characters for the respective lines can be applied as long as limitation is imposed on the transversal and longitudinal dimensions of the print area. Further, the technological thought that the input candidate character at the tail of the character string is deleted and that determined characters whose number is the same as that of the limited character number is registered can be applied to any apparatus having limitation on the number of the characters to be registered in the apparatus.

Further, in the above embodiment, as a character input structure a character selection dial (character selecting means) is employed. However, it is as a matter of course that the third and fourth aspects of the present invention can be applied to the apparatus having a character selecting means other than a character selection dial.

Further, in the above embodiment, the line allowable character numbers for the respective lines are determined by calculation. However, a table of allowable character numbers for the respective lines are provided, and the allowable character numbers for the respective lines may be extracted by employing the types of the seal and the character sizes as keys.

Next, an embodiment of a seal producing apparatus to which the character information processing method according to the fifth aspect of the present invention and the character information processing apparatus according to the sixth aspect of the present invention are applied will be described in detail with reference to the drawings.

In the seal producing apparatus according to this embodiment, the configuration of the electrical mechanism (including an information processing unit and an imprint transfer control unit) is configured as shown in FIG. 1. Also, the mechanical-optical mechanism (including a printing unit and a light irradiating unit) and the seal are also configured as shown in FIG. 2, and the outer appearance of the seal producing apparatus is configured as shown in FIG. 3. Further, the dial key section 11B, the display unit 33, and the plate making sheet 60 are also configured as shown in FIGS. 4, 5A, 6A and 6B, respectively. Furthermore, the procedures performed by the user is executed as shown in FIG. 7. Accordingly, the detailed description of these features are omitted. In the following description of the fifth and sixth aspects of the present invention, the reference numerals used in the description of the embodiment according to the first and second aspects of the present invention are also applied appropriately.

The main characteristic feature of the fifth aspect of the present invention is the method of deciding the character sizes of the respective lines. Various processing programs (see FIGS. 20 and 21) and fixed data (See FIGS. 20 to 29) associated with the process of the characteristic feature are stored in the ROM 22. The CPU 21 executes the various programs associated with the featured process appropriately while making use of the fixed data.

In the following description, a processing of setting attributes of style associated with deciding the character sizes of the respective lines, and processing of deciding the character sizes of the respective lines executed when a decision type of "らくらく" is selected are described in this order.

Figure 20:
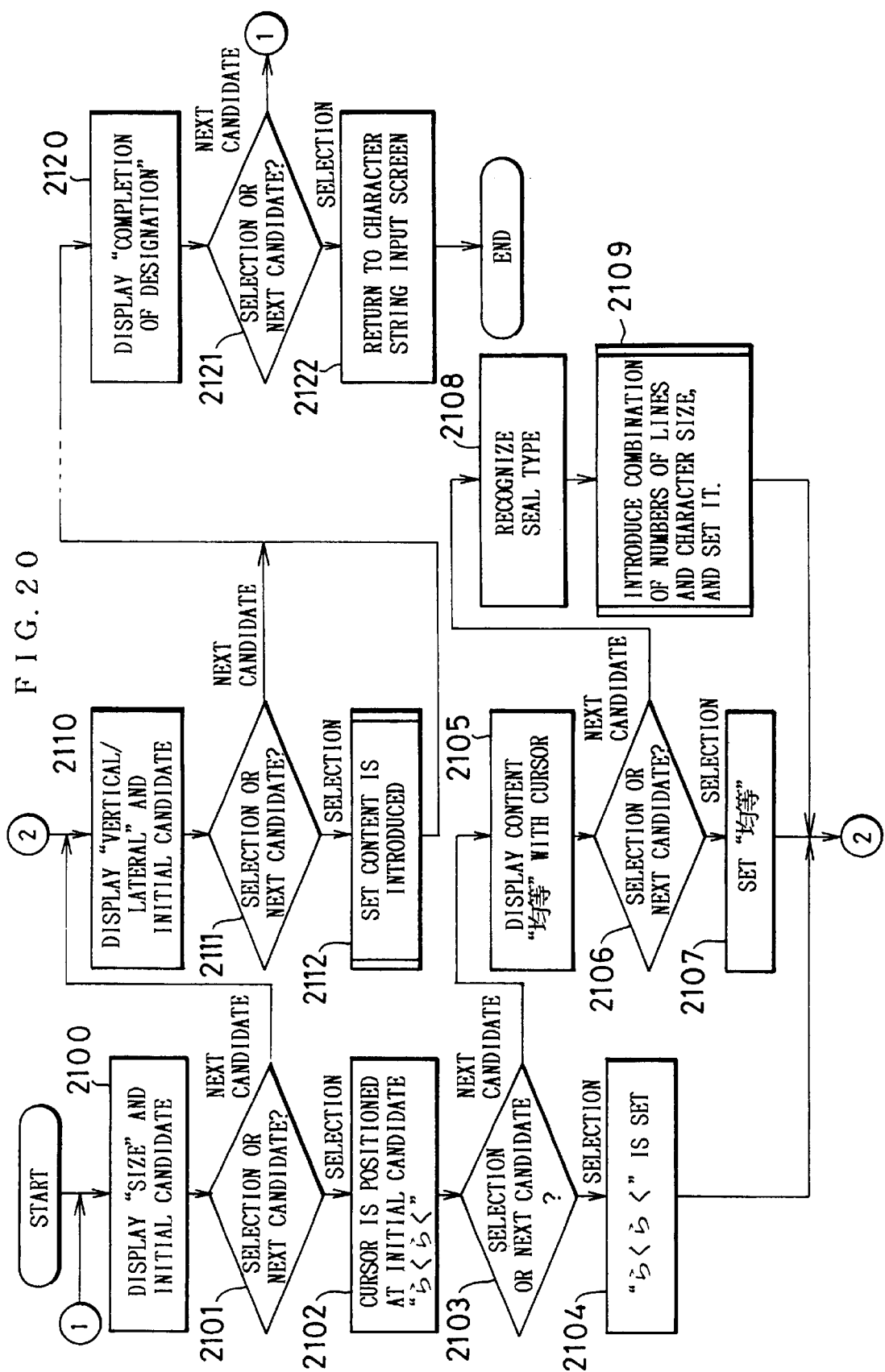
FIG. 20 is a flowchart of processing of setting a style attribute in a seal producing apparatus according to the embodiment of the fifth and sixth aspects of the present invention.

FIG. 20 is a flowchart showing processing of a sequence of setting style attributes executed by the CPU 21 beginning with the operation of the style setting key.

The term "style" as used herein refers to decorative effect with respect to the entire seal face member. As attributes belonging to the style, the character sizes of the respective lines, vertical writing vs. lateral writing, the arrangement of the characters in the respective lines (aligning the forefront of the respective lines, centering the respective lines, and aligning the positions of the characters situated at the left and right ends of the respective lines) and adding an outer frame or table-making are provided. When the user intends to set these style attributes, the user operates a style setting key under the state that display screen for introducing an input character string is displayed. In this case, the CPU 21 starts the processing shown in FIG. 2.

The CPU 21 first causes the liquid crystal display 33A to display the title "size" and the initial candidate of the character size (in this case "らくらく" is assumed to be selected) with the cursor positioned at the title, and judges whether or not either of the selection key 80 and the next candidate keys 83 and 84 is operated (steps 2100 and 2101). Incidentally, the initial candidate is determined as one provided by the apparatus when setting of a style is applied with respect to the inputted character string for the first time, and the one selected immediately before the operation of style setting when the setting is the second or later setting.

At this occasion, the selection key is operated, the cursor is move to the initial candidate "らくらく" and the title "サイズ" (size) and the initial candidate of the character size "らくらく" are displayed on the liquid crystal display 33A, and it is judged whether or not either one of the selection key and the next candidate key is operated (steps 2102 and 2103). Under this state, when the selection key is operated, information representing that the "らくらく" is selected as the decision type of the character sizes of the respective lines is stored, and processing proceeds to step 2110 as later described (step 2104).

On the other hand, the next candidate key is operated, the title "サイズ" (size) and another choice of the character size "均等" (proportional printing/display) are displayed on the liquid crystal display 33A with the cursor situated at the choice "均等", and it is judged whether the selection key is operated or the next candidate key is operated (steps 2105 and 2106). Under this state, when the selection key is operated, information representing that "均等" is selected as the decision type of the character sizes is stored, and processing proceeds to step 2110 as later described (step 2107). Further, when the next candidate key is operated, the type of the seal is judged, and thereafter the combination of the number of lines and the character sizes of the respective lines designated by the user are introduced, and the processing proceeds to step 2110 (step 2109).

While the details of the processing executed at step 2109 are omitted, the number of lines is deleted by the user, and thereafter candidates of the combination of the character sizes of the respective lines determined by the type of the seal and the number of lines are sequentially displayed in a graphical manner.

The term "均等" (proportional printing/display) refers to a decision type of the character sizes of the respective lines in which the apparatus automatically allocates the same character size to all the lines based on the number of lines and the length of the longest line at the processing in plate-making and layout display. The term "らくらく" refers to a decision type of the character sizes of the respective lines in which the apparatus automatically allocates character sizes to the respective lines so that the lengths of the respective lines engraved on the seal face may become as same as possible based on the number of lines and the differences in the lengths of the respective lines. As an imprint pattern, the users require that the proportion of the portion of the characters (black ratio) become as high as possible. To meet this requirement, besides "均等", "らくらく" (very easy) is also provided as a decision type in which the apparatus automatically allocate the character sizes to the respective lines.

As a result of judgment at the above-described step 2101, when it is judged that the next candidate key is operated, this means that as to the character size the initial character size "らくらく" is adopted.

At step 2110, the CPU 21 causes the liquid crystal display 33A to display a title "vertical/lateral" and an initial choice of vertical writing or lateral writing (in this case, assume that "lateral writing" is selected) with the cursor positioned at the title. At step 2111, the CPU 21 judges whether a selection key is operated or a next candidate key is operated. When the selection key is operated, concrete content of the vertical writing and the lateral writing is introduced at step 2112.

While not shown in the drawings, the attributes regarding the arrangement of the characters of the respective lines (title "allocation"), the attributes regarding whether or not an "outer frame" or a table-making (title "outer frame/table-making") are also subjected to similar processing. The change of the title is executed when the next candidate key is operated or setting of the contents of the attributes associated with the title previous by one is completed.

Note that as the title to be displayed on the liquid crystal display 33A, "completion of designation" is also provided. While "completion of designation" is displayed as the title (step 2120), the CPU 21 also judges whether the selection key or the next candidate key is operated (step 2121). When the next candidate key is operated, proceeding returns to the above-mentioned step 2100. When the selection key is operated, the display is returned to the screen for introducing an inputted character string, and a sequence of the style setting processing is completed (step 2122).

Next, processing of deciding the character size executed when the function "らくらく", which is the characteristic feature of the present embodiment, is set will be described with reference to the flowchart shown in FIG. 21.

When plate-making or layout display is instructed, the inputted character string is developed in the printing buffer or the display buffer. In order to execute developing in the buffer, it is necessary that various attributes should be determined. When the decision type of the character sizes of the respective lines is "均等" or "らくらく", the character sizes of the respective lines are determined when plate-making or layout display is instructed and before the development to the buffer is started.

In this embodiment, a characteristic feature lies in the processing of determining the character size executed when "らくらく" is set. Hereinafter, the processing of determining the character size executed when "らくらく" is set. The processing of determining the character size at the time of setting "らくらく" is, roughly speaking, the same irrespective of the type of the seal. However, detailed features are different. Hereinafter, the processing of determining the character size will be described employing as an example the case where a rectangular seal is mounted.

Incidentally, the processing executed when "均等" is set will be briefly explained. The number of the lines of the inputted character strings are recognized and length information on the longest line is obtained, and by employing the number of lines and line information of the longest line as keys, accessing a table for allocating a character size unique to the seal type amounted at that time, and determine a character size common to the respective lines.

Figure 21:
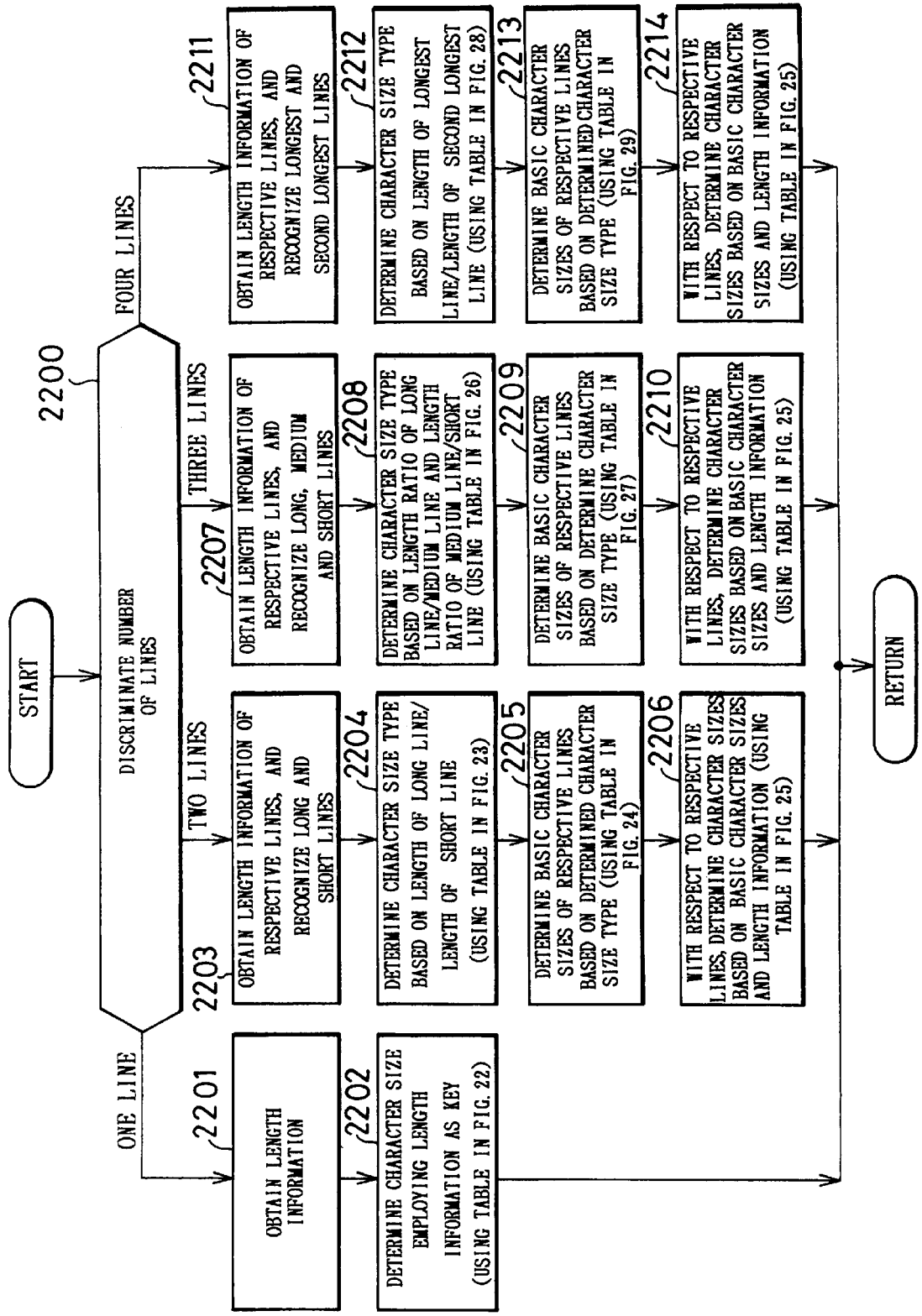
FIG. 21 is a flowchart of processing of deciding character sizes of respective lines in a seal producing apparatus according to the embodiment of the fifth and sixth aspects of the present invention.

FIG. 21 shows processing of determining the character size executed after the CPU 21 recognizes that the seal type is a rectangular seal, and "らくらく" is set. The processing is based on the notion that characters are packed to the dimension (area) of the seal face member determined by the seal type while keeping the character size as large as possible. In other words, the processing is executed for deciding a character size while keeping the black ratio as high as possible.

The CPU 21, after entering the processing shown in FIG. 21, first recognizes the number of lines of the inputted character strings, and discriminates the number of the lines of the inputted character string (step 2200). Note that the number of lines thus recognized is the number of lines in which a determined character is present. The lines to which slewing is applied but in which a determined character is absent are excluded from counting.

When the number of the inputted character string is one, the CPU 21, after obtaining length information thereof (step 2201), determines a character size by accessing the character size decision table for one line regarding a rectangular seal, the example thereof being shown in FIG. 22, while employing the length information as a key(step 2202).

While the method of defining line length information is optional, here the line length information is defined by the number of dots obtained assuming that the smallest character size (assuming reduced S size) that can be developed in the apparatus is set to the line. Note that, even when the basic character size of the line is set, the number of characters cannot be immediately taken as length information of the line. This is because it is allowed that different character sizes are set to a part of characters of the line (i.e., setting character size by each character).

Further, as the character sizes, H, U, G, L, M and S are provided in a decreasing order of dimension. Further, character sizes obtained by contracting or expanding these character sizes in the sub-scanning direction. In FIG. 22, the size "縮Sサイズ" (reduced S size) represents a character size obtained by reducing S, while the size "伸Hサイズ" (expanded H size) is a character size obtained by expanding the H size.

Incidentally, when the type of the seal is a type other than a rectangular seal, the character size decision table for one line which is accessed at step 2202 is different from that of a rectangular seal. Except for the difference in the table, the character size in another type of seal having one line is determined by the same processing as in the rectangular seal.

The CPU 21, after recognizing, as a result of the above-mentioned judgment on the number of the lines, that the number of lines is two, obtains length information of the respective lines to recognize the long line and the short line (step 2203). Thereafter, the CPU21 obtains the value of [(the length of the long line)÷(the length of the short line)] and decide a character size type (form of combination of character sizes) by accessing the size type decision table for two lines which is common to all the seal types, an example thereof being shown in FIG. 23, while employing the value as a key.

Thereafter, basic character sizes of the respective lines are decided by accessing the basic character size decision table of the respective lines for two lines which is common to all the seal types, an example thereof being shown in FIG. 24, while employing the fact that the seal is a rectangular seal and the type of the decided size as keys (step 2205). In the combinations of two character sizes in FIG. 24 (for example, G+L), the left size (G) represents a basic character size of a short line, while the right size (L) represents a basic character size of a long line.

With respect to the respective lines, while employing the basic character size obtained at step 2205 and the line length information obtained at step 2203 as keys, by accessing character size decision table of the respective lines common to the second to fourth lines, an example thereof being shown in FIG. 25, the character sizes of the respective lines are determined (step 2206).

When the type of the seal is a type other than a rectangular seal, the field of the basic character size decision table for two lines which is accessed at step 2205, and the character size decision table which is accessed at step 2206 are different from those of a rectangular seal. Except for these points, through the same processing as in the rectangular seal, character sizes of the two lines can be determined.

After recognizing that the number of lines is three as the result of judgment on the number of lines, the CPU 21 recognizes a long line (the longest line), medium line (the second longest line), and a short line (the shortest line) (STEP 2207). Thereafter, a value of [(the length of the long line)÷(the length of the medium line)] and a value of [(the length of the medium line)÷(the length of the short line)] is obtained. By accessing the size-type decision table for three lines common to all the seal types while employing these values as keys, an example of the decision table being shown in FIG. 26, the character size type is determined (step 2208).

Thereafter, by accessing the basic character size decision table of the respective lines for three lines common to all the seal types while employing the fact that the seal type is the rectangular seal and the type of decided size as keys, the basic character sizes of the respective lines are determined (step 2209). In the combinations of three character sizes in FIG. 27 (for example, G+M+S), the left size (G) represents the basic size of the short line, the medium size (M) represents the basic character size of the medium line, and the right size (S) represents the basic size of the long line.

Next, with respect to the respective lines, the character sizes of the respective lines is determined by accessing the character size decision table of the respective lines common to two to four lines of a rectangular seal, an example thereof being shown in FIG. 25, while employing the basic character size obtained at step 2209 and length information obtained at step 2207 as keys (step 2210).

When the seal type is a type other than a rectangular seal, the field of the basic character size decision table for three lines to be accessed at step 2209, and the character size decision table which is accessed at step 2210 are different from those of a rectangular seal. Except for these points, the character sizes of three lines can be determined in accordance with the same processing as the rectangular seal.

After recognizing that the number of lines is four as a result of above-mentioned judgment on the number of lines, the CPU 21 obtains the length information to recognize the longest line and the second longest line (hereinafter referred to as "second longest line")÷(step 2211), and thereafter a value of [(the length of the longest line)÷(the length of the second longest line)] is obtained. Thereafter, character size type is determined by accessing the size type decision table for four lines common to all the seal types, an example thereof being shown in FIG. 28, while employing the value as a key (step 2212). As is shown in FIG. 28, the reason why the number of types is small in the case of four lines is that the number of lines is as many as four lines and that the number of the actual combination of the character sizes itself is small. Therefore, as the ratio of the length, only the ratio between the longest line and the second longest line is obtained.

Thereafter, the basic character sizes of the respective lines are determined by accessing the basic character size decision table of the respective lines for four lines common to all the seal types, an example thereof being shown in FIG. 29, by employing the fact that the seal type is the rectangular seal and a determined size type (step 2213). Incidentally, among the combinations of four character sizes in FIG. 29, as the character proceeds leftward, the character corresponds to shorter lines.

Thereafter, with respect to the respective lines, basic character sizes of the respective lines are determined by accessing the character size decision table of the respective lines common to two to four lines with respect to a rectangular seal, an example thereof being shown in FIG. 25, while employing the basic character size obtained at step 2213 and the length information of the line as keys (step 2214).

When the seal type is a seal type other than a rectangular seal, the field of the basic character decision table for four lines which is accessed at step 2213, and character size decision table are different from those of the rectangular seal. Except for these points, in accordance with the same processing as in the rectangular seal, the character sizes of the four lines can be determined.

Thus, the character sizes of the respective lines are determined, considering other attributes (vertical writing vs. Lateral writing, etc.), dot patterns of the inputted character string are developed in the print buffer or the display buffer.

According to the above embodiment, as a type in which the apparatus automatically determines the character size of the line, "らくらく" is prepared. When "らくらく" is selected, the apparatus is configured such that the black ratio of the imprint pattern is enhanced. Therefore, the users are not required to perform complicated operations, and a seal having a high black ratio which gives a natural impression can be produced.

In the above embodiment, the apparatus in which the maximum line number which can be inputted by the apparatus (which depends on the type of the seal) is four is presented, it is as a matter of course that the number of lines may be three or smaller, or five or larger.

It is also as a matter of course that the combination of the lines used for calculating the length ratio for determining the type of the combination of the character size is not limited to the embodiments described above. The stages in the length (number of dots) employed when deciding the final character size are not limited to the above embodiment.

Further, in the above embodiment, to the seal producing apparatus for forming unevenness on the seal face member, the fifth and sixth aspects of the present invention are applied. The method of forming unevenness on a seal face member is not limited those in the above embodiment. Further, The fifth and sixth aspects of the present invention can be also applied to a seal producing apparatus in which a seal face member is treated such that ink partially oozes to print an imprint image on a sheet. In this case, as well as when the layout display is executed, when the face member is required to be treated so that ink partially oozes to form an imprint image on a sheet, the processing shown in FIG. 21 must be executed. Further, the fifth and sixth aspects of the present invention can be also applied to an apparatus for processing character information in which a printed or transferred medium has the same limitations as imposed on a seal face member. For example, in the case of tape printing apparatus, since the printed medium is a tape, generally speaking, while limitation is imposed on the number of lines, no limitation is imposed on the number of characters of the respective lines. However, when the character string is inputted under the state that a tape has a limitation on its length, the number of characters of the respective lines are limited. In this case, the above-mentioned technological thought can be applied.

Further, the method of deciding the character sizes of the respective lines according to the fifth and sixth aspects of the present invention can be applied to the case where a predetermined number of characters are displayed in a fixed area, such as a window display of a personal computer.

As described above, according to the first aspect of the present invention, when an instruction of developing an inputted character string in a buffer is issued, the line length judging means recognizes length information of the respective lines of the inputted character string, judges the existence of a line longer than a threshold length determined by the type of a dimension of a print medium or transfer medium, and the slewing addition control means divides the character string longer than the threshold length into character strings of two lines, and the character string developing means develops the character string to which slewing is added or an inputted character string in a buffer. With this configuration, inputted character string can be developed in the print buffer, display buffer, and the like in a well-balanced manner without inserting slewing at the time of inputting a character string.

According to the apparatus for processing character information according to the second aspect of the present invention, the character number recognizing means recognizes the total character number, the character arrangement determining means determines the character size, the number of lines and the character numbers of the respective lines in accordance with the total character number thus recognized. Also, the character string developing means develops the input character string in the buffer in accordance with the character size, the number of lines, and the character numbers in the respective lines determined by the character arrangement determining means. With this configuration, input character string can be developed in the print buffer, display buffer, and the like in a well-balanced manner without inserting slewing at the time of inputting the character string.

In the apparatus for processing character information according to the third aspect of the present invention, the number of characters allowed in the respective lines are determined. When the input character number exceeds the number of characters allowed in the line, the characters in the exceeding portion and the characters in the not exceeding portion are displayed in different manners. With this configuration, the user can recognize the propriety of the input character string in the input stage before printing or layout display is carried out, and cope with the situation appropriately by, for example, performing slewing.

In the apparatus for processing character information according to the fourth aspect of the present invention, when the inputted and determined character number is equal to the limited character number and an instruction of registering the character string to the apparatus is issued under the state that an input candidate character exists at the tail of the determined character string, the inputted and determined character string excluding the input candidate character is registered. With this configuration, even when the user mistakenly input input candidate character after inputting a necessary character string up to the limited character number, it is unnecessary to delete the input candidate character thus mistakenly inputted when issuing an instruction for registration, so that operability is enhanced.

In the method for processing character information according to the fifth aspect of the present invention and the apparatus for processing character information according to the sixth aspect of the present invention, when the number of lines of the input character string is two or more, length information of the respective lines obtained when the same character size is allocated to the respective lines, and concurrently the order of the length information is obtained; a ratio in length between specific two lines of a pair with respect to one or more pairs, and a character size type among the respective lines is determined based on the one or more ratios thus obtained; basic character sizes of the respective lines are determined based on the character size type thus determined; and thereafter with respect to the respective lines a character size of a line is determined based on the length information and the basic character size of the line. With this configuration, the proportion of the character string in a print medium or display area having limitations on its longitudinal and transversal dimensions can be enhanced without requiring the user to perform complicated operations.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. An apparatus for processing character information in which an input character string is printed or transferred in a print or transfer area whose transverse and longitudinal dimensions are limited, the apparatus comprising:

means for inputting a character string in an input mode in which an entire character string to be printed or transferred is input without inputting slewing;

display means for displaying the input character string;

line allowable character number determining means for determining the number of characters allowed in each line;

wherein the line allowable character number determining means determines, when a character size of a line is designated, the number of characters allowed in the respective lines based on (a) a character size obtained by reducing the designated character size in the widthwise direction thereof and (b) the size of the print area; and display control means for displaying, when the number of input characters exceeds the number of characters allowed in the line, the part of the character string within the number of characters without regard to words allowed for the line and the part of the character string overflowing the number of characters without regard to words allowed in the line in such a manner that each of the characters overflowing the number of characters allowed in the line is displayed in a different manner at the end of the string of allowable characters from the displaying manner of any of characters in the character string within the number of characters allowed for the line.

2. The apparatus for processing character information according to claim 1, wherein in a character size deciding mode in which the apparatus can automatically determine a character size, the line allowable character number determining means determines the number of characters allowed in each line based on a minimum character size which can be printed and the size of the print area.

* * * * *

UNITED STATES PATENT AND TRADEMARK OFFICE
CERTIFICATE OF CORRECTION

PATENT NO.    : 6,657,738 B1
DATED         : December 12, 2003
INVENTOR(S)   : Watanabe et al It is certified that error appears in the above-identified patent and that said Letters Patent is hereby corrected as shown below:

Column 1,
Line 18, cancel "ultraviolet-curade" and insert -- ultraviolet-curable --.

Column 2,
Line 54, cancel "an" and insert -- a --.

Column 4,
Line 41, cancel "on" and insert -- in --.

Column 12,
Line 10, cancel "6Q" and insert -- 6A --.
Line 21, "62.having" should read -- 62 having --.

Column 13,
Line 49, "imprint image" should read -- imprint image. --.
Line 50, "inputted.)." should read -- inputted.) --.

Column 16,
Line 22, "string." should read -- string --.

Column 19,
Line 3, characters in quotation marks should line up with "(excellent)".

Column 23,
Line 62, insert after "plex" -- without regard to wards --.

Column 25,
Line 33, delete "is a view".

UNITED STATES PATENT AND TRADEMARK OFFICE
CERTIFICATE OF CORRECTION

PATENT NO.   : 6,657,738 B1
DATED        : December 12, 2003
INVENTOR(S)  : Watanabe et al It is certified that error appears in the above-identified patent and that said Letters Patent is hereby corrected as shown below:

Column 26,
Line 62, "5A" should read -- 5 --.

Column 31,
Line 52, "Lateral" should read -- lateral --.

Signed and Sealed this

Thirty-first Day of August, 2004

JON W. DUDAS
*Director of the United States Patent and Trademark Office*